United States Patent
Dhagat et al.

(10) Patent No.: US 11,378,207 B2
(45) Date of Patent: Jul. 5, 2022

(54) SWAGED PIPE FITTING SYSTEMS AND METHODS

(71) Applicant: TRINITY BAY EQUIPMENT HOLDINGS, LLC, Houston, TX (US)

(72) Inventors: Alok Dhagat, Katy, TX (US); Matthew Allen Hegler, Kingwood, TX (US); Mark Douglas Kalman, Luthersville, GA (US); Richard Charles Lawrence, Mont Belvieu, TX (US); Mikel Lee Lewis, Baytown, TX (US); Nader Matari, Houston, TX (US)

(73) Assignee: Trinity Bay Equipment Holdings, LLC, Houston, TX (US)

( * ) Notice: Subject to any disclaimer, the term of this patent is extended or adjusted under 35 U.S.C. 154(b) by 0 days.

(21) Appl. No.: 16/953,595

(22) Filed: Nov. 20, 2020

(65) Prior Publication Data

US 2021/0156498 A1 May 27, 2021

Related U.S. Application Data

(60) Provisional application No. 62/939,375, filed on Nov. 22, 2019.

(51) Int. Cl.
*F16L 11/08* (2006.01)
*F16L 13/14* (2006.01)
(Continued)

(52) U.S. Cl.
CPC ............ *F16L 13/142* (2013.01); *F16L 33/01* (2013.01); *F16L 11/081* (2013.01); *F16L 33/28* (2013.01); *F16L 39/02* (2013.01)

(58) Field of Classification Search
CPC ........ F16L 13/142; F16L 11/02; F16L 11/083; F16L 11/08; F16L 11/20; F16L 11/12;
(Continued)

(56) References Cited

U.S. PATENT DOCUMENTS

| 775,769 A | 11/1904 | Feust |
|---|---|---|
| 1,809,874 A | 6/1931 | Stone |

(Continued)

FOREIGN PATENT DOCUMENTS

| AU | 2014299014 | 1/2019 |
|---|---|---|
| AU | 2014363465 | 1/2019 |

(Continued)

OTHER PUBLICATIONS

United States Patent and Trademark Office; PCT International Search Report, issued in connection to application No. PCT/US20/61574; dated Feb. 10, 2021; 2 pages; US.

(Continued)

*Primary Examiner* — Matthew Troutman
*Assistant Examiner* — William S. Choi
(74) *Attorney, Agent, or Firm* — Conrad J. Hsu

(57) ABSTRACT

Techniques for implementing and/or installing a system including pipe segment tubing and a swaged pipe fitting secured to the pipe segment tubing. The pipe segment tubing includes a carcass layer, an internal pressure sheath layer disposed around the carcass layer, a reinforcement layer disposed around the internal pressure sheath layer, and an outer sheath layer disposed around the reinforcement layer. The swaged pipe fitting includes a fitting body that defines a bore, an internal pressure sheath seal that seals the internal pressure sheath layer of the pipe segment tubing within the swaged pipe fitting, and a fitting jacket secured to the fitting body, in which the fitting jacket is conformally deformed around the pipe segment tubing to anchor the reinforcement layer of the pipe segment tubing in the swaged pipe fitting.

13 Claims, 12 Drawing Sheets

(51) Int. Cl.
*F16L 33/01* (2006.01)
*F16L 33/28* (2006.01)
*F16L 39/02* (2006.01)

(58) Field of Classification Search
CPC . F16L 33/01; F16L 33/22; F16L 33/23; F16L 33/26; F16L 33/28; F16L 35/00; F16L 39/02
USPC ............ 285/382, 222.1, 222.2, 222.3, 222.4, 285/222.5
See application file for complete search history.

(56) References Cited

U.S. PATENT DOCUMENTS

| | | | |
|---|---|---|---|
| 2,112,238 A | 3/1938 | Guarnaschelli |
| 2,363,586 A | 11/1944 | Guarnaschelli |
| 2,437,933 A | 3/1948 | Brennan |
| 2,583,956 A | 1/1952 | Lindsay et al. |
| 2,685,459 A | 8/1954 | Panagrossi |
| 2,757,691 A | 8/1956 | Copeland |
| 2,809,056 A | 10/1957 | Kaiser |
| 2,848,254 A | 8/1958 | Millar |
| 2,888,277 A | 5/1959 | Melsom |
| 3,055,682 A | 9/1962 | Bacher et al. |
| 3,158,388 A | 11/1964 | Marshall |
| 3,306,637 A | 2/1967 | Press et al. |
| 3,393,267 A | 7/1968 | Busse |
| 3,844,587 A | 10/1974 | Fuhrmann et al. |
| 3,874,064 A | 4/1975 | Chevalier |
| 3,902,745 A | 9/1975 | Mooney et al. |
| 3,992,044 A | 11/1976 | Muslin |
| 3,993,330 A | 11/1976 | Goransson |
| 4,000,918 A | 1/1977 | Reker |
| 4,033,614 A | 7/1977 | Hanson |
| 4,063,757 A | 12/1977 | Fuhrmann |
| 4,123,088 A | 10/1978 | Tanaka |
| 4,549,581 A | 10/1985 | Unno et al. |
| 4,569,541 A | 2/1986 | Eisenzimmer |
| 4,770,446 A | 9/1988 | Keller |
| 4,775,171 A | 10/1988 | Marshall |
| 4,783,980 A | 11/1988 | Varga |
| 5,031,301 A | 7/1991 | Oetiker |
| 5,080,405 A | 1/1992 | Sasa et al. |
| 5,297,586 A | 3/1994 | McIntosh |
| 5,430,929 A | 7/1995 | Sanders |
| 5,654,499 A | 8/1997 | Manuli |
| 5,738,385 A | 4/1998 | Homann et al. |
| 5,860,682 A | 1/1999 | Belcher |
| 6,019,137 A | 2/2000 | Secher et al. |
| 6,099,045 A | 8/2000 | Pirona |
| 6,131,959 A | 10/2000 | Profunser |
| 6,161,880 A | 12/2000 | Peppel |
| 6,173,995 B1 | 1/2001 | Mau |
| 6,273,142 B1 | 8/2001 | Braad |
| 6,360,781 B1 | 3/2002 | Braad |
| 6,382,681 B1 | 5/2002 | Berton et al. |
| 6,386,594 B1 | 5/2002 | Schuttler et al. |
| 6,412,825 B1 | 7/2002 | Langkjaer |
| 6,478,338 B1 | 11/2002 | Dalmolen et al. |
| 6,592,153 B1 | 7/2003 | Belcher |
| 6,827,375 B2 | 12/2004 | Fraser |
| 6,832,502 B1* | 12/2004 | Whyte |
| 6,866,302 B2 | 3/2005 | Furata |
| 6,877,781 B2 | 4/2005 | Edler |
| 6,889,715 B2 | 5/2005 | Fraser et al. |
| 6,904,939 B2 | 6/2005 | Jung et al. |
| 6,905,146 B2 | 6/2005 | Gennasio |
| 6,923,477 B2 | 8/2005 | Buon et al. |
| 6,993,819 B2 | 2/2006 | Homann |
| 7,055,551 B2 | 6/2006 | Fraser et al. |
| 7,066,497 B2 | 6/2006 | Fullbeck et al. |
| 7,080,860 B2 | 7/2006 | Takagi et al. |
| 7,175,208 B2 | 2/2007 | Belcher |
| 7,204,524 B2 | 4/2007 | Ecleston |
| 7,338,090 B2 | 3/2008 | Baldwin et al. |
| 8,096,589 B2 | 1/2012 | De Aquino et al. |
| 8,104,797 B2 | 1/2012 | Eccleston et al. |
| 8,220,129 B2 | 7/2012 | Eccleston et al. |
| 8,485,562 B2 | 7/2013 | Zerrer |
| 8,499,799 B2 | 8/2013 | Saltel et al. |
| 8,720,066 B2 | 5/2014 | Witz et al. |
| 8,925,976 B2 | 1/2015 | Treichel et al. |
| 9,022,123 B2 | 5/2015 | Campello et al. |
| 9,212,771 B2 | 12/2015 | Baldwin et al. |
| 9,217,526 B2 | 12/2015 | Eccleston |
| 9,217,527 B2 | 12/2015 | Menor |
| 9,273,810 B1 | 3/2016 | Martin |
| 9,334,993 B2 | 5/2016 | Cloose et al. |
| 9,371,945 B2 | 6/2016 | Ivett |
| 9,523,446 B2 | 12/2016 | Kassow et al. |
| 9,534,713 B2 | 1/2017 | Castel et al. |
| 9,534,719 B2 | 1/2017 | Eccleston et al. |
| 9,541,225 B2 | 1/2017 | Strunk |
| 9,574,690 B2 | 2/2017 | Clevelario et al. |
| 9,618,419 B2 | 4/2017 | Demanze et al. |
| 9,643,226 B2 | 5/2017 | Thompson et al. |
| 9,651,177 B2 | 5/2017 | Nielinger et al. |
| 9,921,127 B2 | 3/2018 | Clevelario et al. |
| 9,957,767 B2 | 5/2018 | Nguyen |
| 9,962,750 B2 | 5/2018 | Thompson et al. |
| 9,976,681 B2 | 5/2018 | Karabelas et al. |
| 10,024,469 B2 | 7/2018 | Strunk |
| 10,113,677 B2 | 10/2018 | Bourget et al. |
| 10,190,722 B2 | 1/2019 | Espinasse et al. |
| 10,197,198 B2 | 2/2019 | Glejbol |
| 10,226,823 B2 | 3/2019 | Karpachevskyy |
| 10,226,892 B2 | 3/2019 | Kremers |
| 10,234,068 B2 | 3/2019 | Varagnolo et al. |
| 10,281,065 B2 | 5/2019 | Secher et al. |
| 10,285,223 B2 | 5/2019 | Hatton et al. |
| 10,288,207 B2 | 5/2019 | Littlestar et al. |
| 10,364,925 B2 | 7/2019 | Roberts et al. |
| 10,378,682 B2 | 8/2019 | Cloos et al. |
| 10,408,795 B2 | 9/2019 | Nicolas et al. |
| 10,415,731 B2 | 9/2019 | Boche et al. |
| 10,429,267 B2 | 10/2019 | Grimsley |
| 10,436,667 B2 | 10/2019 | Littlestar et al. |
| 10,442,925 B2 | 10/2019 | Rong et al. |
| 10,451,206 B2 | 10/2019 | Espinasse et al. |
| 10,471,661 B2 | 11/2019 | Boczkowski et al. |
| 10,480,054 B2 | 11/2019 | Valdez et al. |
| 10,487,965 B2 | 11/2019 | Bouey et al. |
| 10,494,519 B2 | 12/2019 | Wilson et al. |
| 10,513,896 B2 | 12/2019 | Gudme et al. |
| 10,527,198 B2 | 1/2020 | Nicolson et al. |
| 10,544,889 B2 | 1/2020 | Bouey et al. |
| 10,544,892 B2 | 1/2020 | Holst |
| 2004/0066035 A1 | 4/2004 | Buon et al. |
| 2005/0071978 A1 | 4/2005 | Burke et al. |
| 2006/0186664 A1 | 8/2006 | Huang |
| 2007/0018450 A1 | 1/2007 | Golafshani |
| 2007/0284878 A1 | 12/2007 | Duquette et al. |
| 2008/0012300 A1 | 1/2008 | Duquette et al. |
| 2008/0191472 A1 | 8/2008 | Vieregge |
| 2010/0068986 A1* | 3/2010 | Eccleston |
| 2010/0090459 A1 | 4/2010 | Duquette et al. |
| 2010/0230952 A1 | 9/2010 | Ong |
| 2011/0006515 A1 | 1/2011 | Yanik et al. |
| 2011/0068572 A1 | 3/2011 | Nacsa et al. |
| 2013/0154257 A1 | 6/2013 | Ault |
| 2014/0124076 A1* | 5/2014 | Roberts |
| 2014/0312612 A1 | 10/2014 | Dhagat et al. |
| 2015/0292661 A1 | 10/2015 | Gilbreath et al. |
| 2015/0316187 A1 | 11/2015 | Matsubara |
| 2015/0345680 A1 | 12/2015 | Espinasse et al. |
| 2016/0153598 A1 | 6/2016 | Bertoni et al. |
| 2016/0208969 A1 | 7/2016 | Bertoni et al. |
| 2016/0290539 A1 | 10/2016 | Nielsen |
| 2016/0327189 A1 | 11/2016 | Schroeder et al. |
| 2017/0102102 A1 | 4/2017 | Goble et al. |
| 2017/0159866 A1* | 6/2017 | Glejbol ............... F16L 11/083 |
| 2017/0299092 A1 | 10/2017 | Larsen et al. |
| 2018/0128404 A1 | 5/2018 | Gray et al. |
| 2018/0224032 A1 | 8/2018 | Cole et al. |

(56) References Cited

U.S. PATENT DOCUMENTS

| | | |
|---|---|---|
| 2018/0231149 A1 | 8/2018 | Glejbol et al. |
| 2018/0231150 A1 | 8/2018 | Glejbol et al. |
| 2018/0231151 A1 | 8/2018 | Straarup |
| 2018/0231163 A1 | 8/2018 | Holst et al. |
| 2018/0245725 A1 | 8/2018 | Glejbol et al. |
| 2018/0283588 A1 | 10/2018 | Gray et al. |
| 2019/0003921 A1 | 1/2019 | Nicholas |
| 2019/0017641 A1 | 1/2019 | Phillips et al. |
| 2019/0024830 A1 | 1/2019 | Glejbol |
| 2019/0094101 A1 | 3/2019 | Spiegel et al. |
| 2019/0101233 A1 | 4/2019 | Hatton et al. |
| 2019/0126567 A1 | 5/2019 | Bornemann et al. |
| 2019/0154186 A1 | 5/2019 | Varagnolo et al. |
| 2019/0162334 A1 | 5/2019 | Westhoff et al. |
| 2019/0162335 A1 | 5/2019 | Yu et al. |
| 2019/0162336 A1 | 5/2019 | Andersen et al. |
| 2019/0186656 A1 | 6/2019 | Kozak et al. |
| 2019/0194440 A1 | 6/2019 | Rong et al. |
| 2019/0211951 A1 | 7/2019 | Clements |
| 2019/0217337 A1 | 7/2019 | Gujare et al. |
| 2019/0219199 A1 | 7/2019 | Snowdon et al. |
| 2019/0219473 A1 | 7/2019 | Littlestar et al. |
| 2019/0242501 A1 | 8/2019 | Bereczkne et al. |
| 2019/0257448 A1 | 8/2019 | Chalmers et al. |
| 2019/0285199 A1 | 9/2019 | Nicolson et al. |
| 2019/0309582 A1 | 10/2019 | Procida |
| 2019/0316711 A1 | 10/2019 | Shippen et al. |
| 2019/0338868 A1 | 11/2019 | Hjorth |
| 2019/0368967 A1 | 12/2019 | Grimsley |
| 2019/0391097 A1 | 12/2019 | Nicolas et al. |
| 2020/0011467 A1 | 1/2020 | Holst et al. |
| 2020/0049280 A1 | 2/2020 | Wang et al. |
| 2020/0102658 A1 | 4/2020 | Wang et al. |

FOREIGN PATENT DOCUMENTS

| | | |
|---|---|---|
| AU | 2017302735 | 1/2019 |
| AU | 2014310509 | 3/2019 |
| AU | 2017319390 | 3/2019 |
| AU | 2017347152 | 5/2019 |
| AU | 2017365730 | 6/2019 |
| AU | 2018211384 | 8/2019 |
| AU | 2018222217 | 8/2019 |
| AU | 2015335367 | 10/2019 |
| AU | 2015345613 | 10/2019 |
| AU | 2018288000 | 1/2020 |
| AU | 2019279941 | 1/2020 |
| BR | 112014017998 | 1/2019 |
| BR | 112018013586 | 1/2019 |
| BR | PI0810573 | 1/2019 |
| BR | PI0819542 | 1/2019 |
| BR | 112019001414 | 2/2019 |
| BR | 112018075840 | 3/2019 |
| BR | 112019004048 | 3/2019 |
| BR | PI0517181 | 3/2019 |
| BR | 112019000076 | 4/2019 |
| BR | 112019007789 | 4/2019 |
| BR | PI0914836 | 4/2019 |
| BR | 112019003669 | 5/2019 |
| BR | 112019005154 | 6/2019 |
| BR | 112013032388 | 7/2019 |
| BR | 112019013850 | 7/2019 |
| BR | PI0720487 | 8/2019 |
| BR | 112012015257 | 9/2019 |
| BR | 112013017957 | 9/2019 |
| BR | 112015027495 | 9/2019 |
| BR | 112016001932 | 9/2019 |
| BR | PI0909348 | 9/2019 |
| BR | 112015002088 | 10/2019 |
| BR | 112019020051 | 10/2019 |
| BR | 112012020776 | 11/2019 |
| BR | 112019012614 | 11/2019 |
| BR | PI0808956 | 11/2019 |
| BR | 112013028806 | 12/2019 |
| BR | 112013000428 | 1/2020 |
| BR | 112019013850 | 1/2020 |
| BR | PI0924891 | 1/2020 |
| CA | 2859433 | 3/2019 |
| CA | 2823056 | 4/2019 |
| CA | 2765294 | 6/2019 |
| CA | 2854955 | 6/2019 |
| CA | 2835008 | 8/2019 |
| CA | 3012146 | 1/2020 |
| CH | 328181 | 2/1958 |
| CN | 100343571 | 10/2007 |
| CN | 201568659 | 9/2010 |
| CN | 203656420 | 6/2014 |
| CN | 104154362 | 11/2014 |
| CN | 104819349 | 8/2016 |
| CN | 107061905 | 8/2017 |
| CN | 107642648 | 1/2018 |
| CN | 109153196 | 1/2019 |
| CN | 109153229 | 1/2019 |
| CN | 109958827 | 7/2019 |
| CN | 110177969 | 8/2019 |
| CN | 106985493 | 11/2019 |
| CN | 108291686 | 11/2019 |
| CN | 110461586 | 11/2019 |
| CN | 110462273 | 11/2019 |
| CN | 107250643 | 12/2019 |
| CN | 108291670 | 1/2020 |
| DE | 3231858 | 3/1983 |
| DE | 4105782 | 9/1992 |
| DE | 202010002591 | 10/2011 |
| DE | 202013105869 | 3/2015 |
| DE | 102018214615 | 6/2019 |
| DK | 3224393 T3 | 1/2019 |
| DK | 2820083 T3 | 2/2019 |
| DK | 2959199 T5 | 2/2019 |
| DK | 3228639 T3 | 2/2019 |
| DK | 2780159 T3 | 4/2019 |
| DK | 3196523 T3 | 4/2019 |
| DK | 2516534 | 7/2019 |
| DK | 2901062 T3 | 8/2019 |
| DK | 3286474 T3 | 9/2019 |
| EP | 1265020 | 8/2004 |
| EP | 1286097 | 9/2005 |
| EP | 1596117 | 11/2005 |
| EP | 1298376 | 12/2006 |
| EP | 1707860 | 3/2009 |
| EP | 2725272 | 4/2017 |
| EP | 3080504 | 9/2017 |
| EP | 3412952 | 12/2018 |
| EP | 2360406 | 1/2019 |
| EP | 2780159 | 1/2019 |
| EP | 3069063 | 1/2019 |
| EP | 3433523 | 1/2019 |
| EP | 3089846 | 2/2019 |
| EP | 3334969 | 2/2019 |
| EP | 3334970 | 2/2019 |
| EP | 3439871 | 2/2019 |
| EP | 2386894 | 3/2019 |
| EP | 2516534 | 3/2019 |
| EP | 2737238 | 3/2019 |
| EP | 2859173 | 3/2019 |
| EP | 3371502 | 3/2019 |
| EP | 3455059 | 3/2019 |
| EP | 3455536 | 3/2019 |
| EP | 3458531 | 3/2019 |
| EP | 2862700 | 4/2019 |
| EP | 3105484 | 4/2019 |
| EP | 3258155 | 4/2019 |
| EP | 3334965 | 4/2019 |
| EP | 3334967 | 4/2019 |
| EP | 3463849 | 4/2019 |
| EP | 3468725 | 4/2019 |
| EP | 3314155 | 5/2019 |
| EP | 3488135 | 5/2019 |
| EP | 2519764 | 6/2019 |
| EP | 2572134 | 7/2019 |
| EP | 2661578 | 7/2019 |
| EP | 3507535 | 7/2019 |
| EP | 3513108 | 7/2019 |
| EP | 2576333 | 8/2019 |

(56) References Cited

FOREIGN PATENT DOCUMENTS

| | | |
|---|---|---|
| EP | 3014157 | 8/2019 |
| EP | 3059481 | 8/2019 |
| EP | 3526437 | 8/2019 |
| EP | 2588787 | 9/2019 |
| EP | 2870397 | 9/2019 |
| EP | 3093546 | 10/2019 |
| EP | 3548280 | 10/2019 |
| EP | 3350498 | 12/2019 |
| EP | 3482112 | 12/2019 |
| EP | 3583344 | 12/2019 |
| FR | 3068104 | 7/2019 |
| FR | 3077997 | 8/2019 |
| FR | 3074251 | 12/2019 |
| FR | 3076337 | 1/2020 |
| GB | 747116 | 3/1956 |
| GB | 861770 | 2/1961 |
| GB | 968174 | 8/1964 |
| GB | 2503880 | 3/2019 |
| GB | 2562674 | 3/2019 |
| GB | 2557571 | 9/2019 |
| GB | 2572120 | 9/2019 |
| GB | 2520756 | 10/2019 |
| GB | 2535925 | 12/2019 |
| GB | 2574296 | 12/2019 |
| HU | E045956 T2 | 1/2020 |
| IN | 330637 | 1/2020 |
| JP | 5306877 | 10/2013 |
| JP | 5619637 | 11/2014 |
| JP | 5638861 | 12/2014 |
| PL | 2678216 T3 | 2/2019 |
| PL | 2379299 T3 | 5/2019 |
| RU | 11858 | 11/1999 |
| RU | 2018113428 | 10/2019 |
| WO | 1993/016317 | 8/1993 |
| WO | 1994/023235 | 10/1994 |
| WO | 2004/001269 | 12/2003 |
| WO | 2007/042832 | 4/2007 |
| WO | 2008/020134 | 2/2008 |
| WO | 2009/115703 | 9/2009 |
| WO | 2011/157970 | 12/2011 |
| WO | 2012/069584 | 5/2012 |
| WO | 2012/153628 | 11/2012 |
| WO | 2014/001249 | 1/2014 |
| WO | 2014/012971 | 1/2014 |
| WO | 2014/013994 | 1/2014 |
| WO | 2015/067928 | 5/2015 |
| WO | 2016/092214 | 6/2016 |
| WO | 2016/170360 | 10/2016 |
| WO | 2017/001774 | 1/2017 |
| WO | 2018/149461 | 8/2018 |
| WO | 2019/016554 | 1/2019 |
| WO | 2019/016558 | 1/2019 |
| WO | 2019/073047 | 4/2019 |
| WO | 2019/022599 | 5/2019 |
| WO | 2019/099219 | 5/2019 |
| WO | 2019/105926 | 6/2019 |
| WO | 2019/112431 | 6/2019 |
| WO | 2019/120677 | 6/2019 |
| WO | 2019/141326 | 7/2019 |
| WO | 2019/165562 | 9/2019 |
| WO | 2019/197538 | 10/2019 |
| WO | 2019/207031 | 10/2019 |
| WO | 2019/238456 | 12/2019 |
| WO | 2020/016325 | 1/2020 |

OTHER PUBLICATIONS

United States Patent and Trademark Office; PCT Written Opinion of the International Searching Authority, issued in connection to application No. PCT/US20/61574; dated Feb. 10, 2021; 8 pages; US.

\* cited by examiner

SWAGED PIPE FITTING SYSTEMS AND METHODS

CROSS-REFERENCE

The present disclosure claims priority to and benefit of U.S. Provisional Patent Application No. 62/939,375, entitled "SWAGED END FITTINGS FOR FLEXIBLE PIPE AND METHODS OF INSTALLING SAME" and filed Nov. 22, 2019, which is incorporated herein by reference in its entirety for all purposes.

BACKGROUND

Flexible pipe can be utilized to transport production fluids, such as oil and/or gas and/or water, from one location to another. Flexible pipe is generally formed as an assembly of a portion of flexible pipe body and one or more end fittings. The end fittings may be used to connect segments of flexible pipe together or to connect them to terminal equipment, such as sub-sea structures or floating facilities. End fittings are important components for terminating and anchoring the pipe layers, sealing and venting gas in these environments.

Existing end fittings have certain deficiencies and disadvantages. For example, current end fittings used with offshore flexible pipe as described in API RP 17B ("17B Recommended Practice for Unbonded Flexible Pipe") with carcass are costly and have a long installation time. Improvements in this field of technology are therefore desired.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one embodiment, a system including pipe segment tubing and a swaged pipe fitting secured to the pipe segment tubing. The pipe segment tubing includes a carcass layer, an internal pressure sheath layer disposed around the carcass layer, a reinforcement layer disposed around the internal pressure sheath layer, and an outer sheath layer disposed around the reinforcement layer. The swaged pipe fitting includes a fitting body that defines a bore, an internal pressure sheath seal that seals the internal pressure sheath layer of the pipe segment tubing within the swaged pipe fitting, and a fitting jacket secured to the fitting body, in which the fitting jacket is conformally deformed around the pipe segment tubing to anchor the reinforcement layer of the pipe segment tubing in the swaged pipe fitting.

In another embodiment, a method of installing a swaged pipe fitting on a pipe segment includes disposing a fitting jacket of the swaged pipe fitting circumferentially around tubing of the pipe segment, in which the fitting jacket is secured to a fitting body of the swaged pipe fitting that defines a body bore, disposing a support cylinder directly adjacent to a carcass layer of the pipe segment, in which the carcass layer of the pipe segment comprises an interlocked metal layer, and conformally deforming the fitting jacket of the swaged pipe fitting around the tubing of the pipe segment to secure the swaged pipe fitting to the pipe segment and to seal tubing of the pipe segment within the swaged pipe fitting.

In another embodiment, a swaged pipe fitting includes a fitting body that defines a body bore, a fitting connector secured to the fitting body to enable the swaged pipe fitting to be connected to another pipeline component, a face seal compressed between the fitting body and the fitting connector, an internal pressure sheath seal compressed against an internal pressure sheath layer of a pipe segment to seal the internal pressure sheath layer within the swaged pipe fitting, a carcass isolating ring that electrically isolates a carcass layer of the pipe segment in the swaged pipe fitting, and a fitting jacket secured to the fitting body, in which the fitting jacket is conformally deformed around an outer sheath layer of the pipe segment to secure the swaged pipe fitting to the pipe segment and to seal the outer sheath layer of the pipe segment within the swaged pipe fitting.

DETAILED DESCRIPTION

Figure 1:
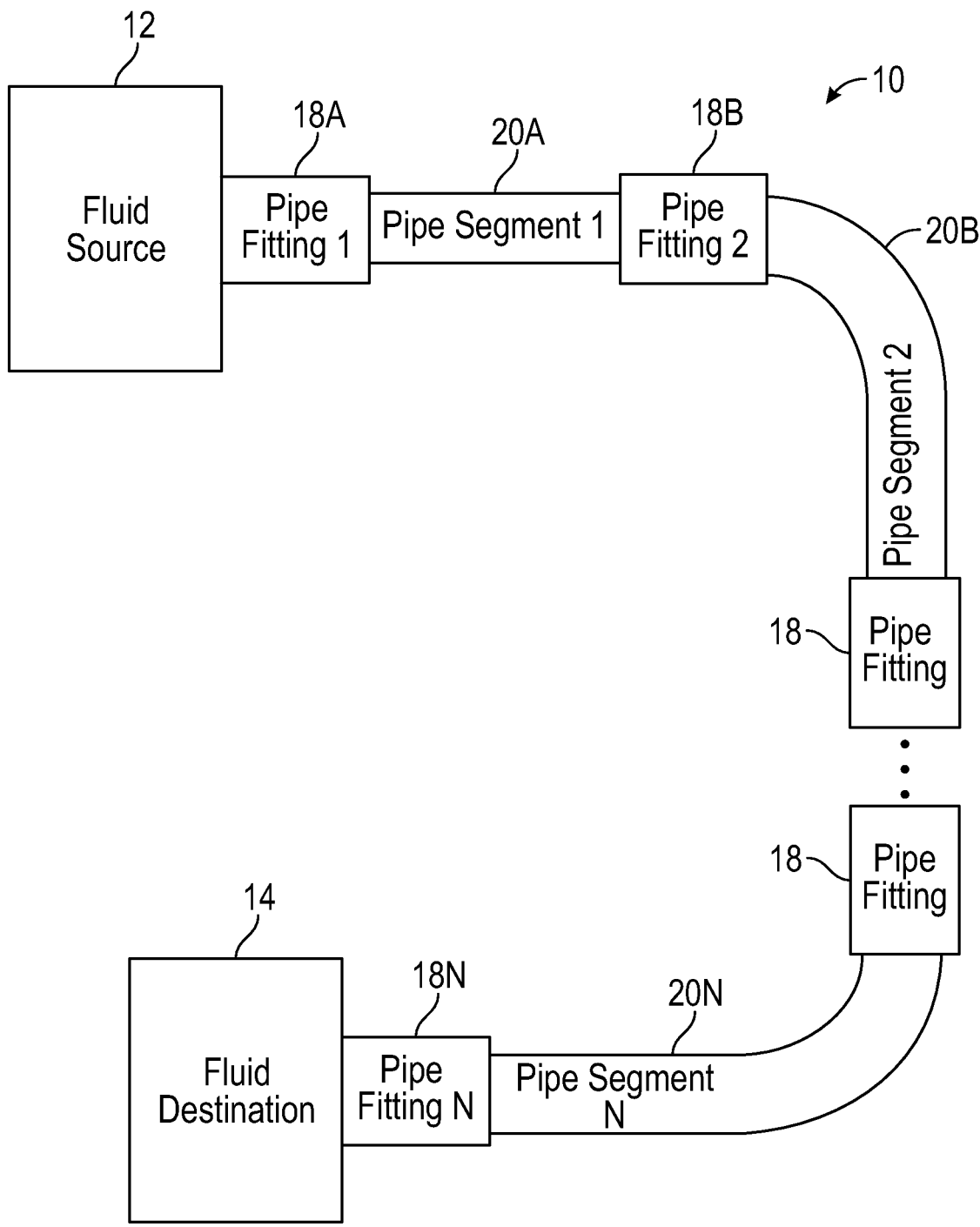
FIG. 1 is a block diagram of an example of a pipeline system including pipe segments and pipe fittings, in accordance with an embodiment of the present disclosure.

One or more specific embodiments of the present disclosure will be described below with reference to the figures. As used herein, the term "coupled" or "coupled to" may indicate establishing either a direct or indirect connection and, thus, is not limited to either unless expressly referenced as such. The term "set" may refer to one or more items. Wherever possible, like or identical reference numerals are used in the figures to identify common or the same features. The figures are not necessarily to scale. Certain features and/or certain views of the figures may be shown exaggerated in scale for purposes of clarification. Additionally, all depicted examples are intended to be illustrative and not limiting.

The present disclosure generally relates to pipeline systems that may be implemented and/or operated to transport (e.g., convey) fluid, such as liquid and/or gas, from a fluid source to a fluid destination. Generally, a pipeline system may include pipe fittings, such as a midline pipe fitting and/or a pipe end fitting, and one or more pipe segments. More specifically, a pipe segment may generally be secured and sealed in one or more pipe fittings to facilitate fluidly coupling the pipe segment to another pipeline component, such as another pipe segment, another pipe fitting, a fluid source, and/or a fluid destination.

An example of a pipeline system 10 is shown in FIG. 1. A pipeline system 10 may generally, be coupled between a fluid source 12 and a fluid destination 14. For example, in some instances, the fluid source 12 may be a production well and the fluid destination 14 may be a fluid storage tank. In other instances, the fluid source 12 may be a first (e.g., lease facility) storage tank and the fluid destination 14 may be a second (e.g., refinery) storage tank.

In any case, the pipeline system 10 may generally convey fluid, such as gas and/or liquid, from the fluid source 12 to the fluid destination 14. The pipeline system 10 may be used in many applications, including without limitation, both onshore and offshore oil and gas applications. For example, the pipeline system 10 may be used to transport hydrocarbon, aqueous fluid, and/or another suitable fluid, such as crude oil, petroleum, natural gas, produced water, fresh water, fracturing fluid, flowback fluid, carbon dioxide, or any combination thereof.

To convey fluid from the fluid source 12 to the fluid destination 14, a pipeline system 10 may include one or more pipe fittings 18 and one or more pipe segments 20. For example, the depicted pipeline system 10 includes a first pipe segment 20A, a second pipe segment 20B, and an Nth pipe segment 20N. Additionally, the depicted pipeline system 10 includes a first pipe (e.g., end) fitting 18A, which couples the fluid source 12 to the first pipe segment 20A, a second pipe (e.g., midline) fitting 18B, which couples the first pipe segment 20A to the second pipe segment 20B, and an Nth pipe (e.g., end) fitting 18N, which couples the Nth pipe segment 20N to the fluid destination 14.

In other embodiments, a pipeline system 10 may include fewer than three (e.g., two or one) pipe segments 20 or more than three (e.g., four, five, or more) pipe segments 20. Additionally or alternatively, in other embodiments, a pipeline system 10 may include fewer than four (e.g., three or two) pipe fittings 18 or more than four (e.g., five, six, or more) pipe fittings 18.

In any case, a pipe segment 20 generally includes tubing that may be used to convey (e.g., transfer and/or transport) water, gas, oil, and/or any other suitable type of fluid. The tubing of a pipe segment 20 may be made of any suitable type of material, such as plastic, metal, and/or a composite (e.g., fiber-reinforced composite) material. In fact, as will be described in more detail below, in some embodiments, the tubing of a pipe segment 20 may have multiple different tubing layers. For example, the tubing of a pipe segment 20 may include a first high-density polyethylene (e.g., fluid containment) layer, one or more reinforcement (e.g., steel strip) layers external to the first high-density polyethylene layer, and a second high-density polyethylene (e.g., external corrosion protection) layer external to the one or more reinforcement layers.

Additionally, as in the depicted example, one or more (e.g., second and/or Nth) pipe segments 20 in a pipeline system 10 may be curved (e.g., large deflection). To facilitate producing a curve in a pipe segment 20, in some embodiments, the pipe segment 20 may be flexible, for example, such that the pipe segment 20 is spoolable on a reel and/or in a coil (e.g., during transport and/or before deployment of the pipe segment 20). In other words, in some embodiments, one or more pipe segments 20 in the pipeline system 10 may be a flexible pipe, such as a bonded flexible pipe, an unbonded flexible pipe, a flexible composite pipe (FCP), a thermoplastic composite pipe (TCP), or a reinforced thermoplastic pipe (RTP). Generally, as described in API RP 17B, a flexible pipe combines low bending stiffness with high axial tensile stiffness, which is achieved by a multi-layer construction. The two basic components are helical reinforcement layers and polymer sealing layers, which allow a much smaller radius of curvature than for a steel pipe with the same pressure capacity. In general, an unbonded flexible has a lower bending stiffness than bonded flexible pipe due to the tubing layers not being bonded to one another. Bending stiffness may also be reduced in both bonded and unbonded flexible pipe when they have annular gaps between adjacent reinforcement strips in the reinforcement layers. In fact, at least in some instances, increasing flexibility (e.g. reducing bending stiffness) of a pipe segment 20 may facilitate improving deployment efficiency of a pipeline system 10, for example, by having long coiled or reeled pipe segments transported to installation locations, thereby substantially reducing the number of pipe fittings relative to rigid pipe installations.

In some embodiments, the annular gaps between reinforcement strips are devoid of solid material. In fact, in some embodiments, the free space in the tubing annulus of a pipe segment 20 may span the length of the pipe segment 20 and, thus, define one or more fluid conduits in the annulus of the tubing, which are separate from the pipe bore. In other words, in such embodiments, a pipe segment 20 may enable fluid flow via its pipe bore, fluid flow via a fluid conduit defined within its tubing annulus, or both.

Figure 2:
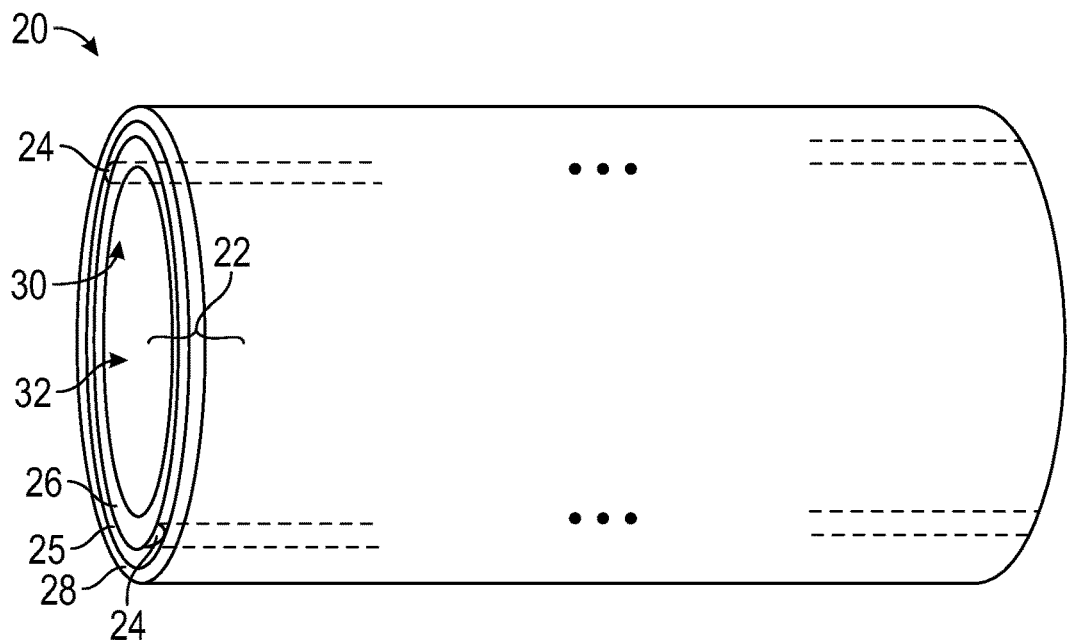
FIG. 2 is a side view of an example of a pipe segment of FIG. 1 that includes a pipe bore defined by its tubing as well as fluid conduits within an annulus of its tubing, in accordance with an embodiment of the present disclosure.

To help illustrate, an example of a pipe segment 20, which includes tubing 22 with annular gaps (e.g., fluid conduits and/or free space) 24 defined in its annulus 25, is shown in FIG. 2. As depicted, the pipe segment tubing 22 includes multiple tubing layers including an internal pressure sheath (e.g., inner barrier) layer 26 and an outer sheath (e.g., outer barrier) layer 28. In some embodiments, the internal pressure sheath layer 26 and/or the outer sheath layer 28 of the pipe segment tubing 22 may be made from composite material and/or plastic, such as high-density polyethylene (HDPE), raised temperature polyethylene (PE-RT), cross-linked polyethylene (XLPE), polyamide 11 (PA-11), polyamide 12 (PA-12), polyvinylidene difluoride (PVDF), or any combination thereof. Although a number of particular layers are depicted, it should be understood that the techniques described in the present disclosure may be broadly applicable to composite pipe body structures including two or more layers, for example, as distinguished from a rubber or plastic single-layer hose subject to vulcanization.

In any case, as depicted, an inner surface 30 of the internal pressure sheath layer 26 defines (e.g., encloses) a pipe bore 32 through which fluid can flow, for example, to facilitate transporting fluid from a fluid source 12 to a fluid destination 14. In some embodiments, the internal pressure sheath layer 26 of a pipe segment 20 may be the innermost layer of the pipe segment 20. However, as will be described in more detail below, in other embodiments, a carcass layer may be disposed under the internal pressure sheath layer 26 and, thus, the carcass layer may be the innermost layer of the pipe segment.

Additionally, in some embodiments, the outer sheath layer 28 of a pipe segment 20 may be the outermost layer of the pipe segment 20. In particular, as described in API RP 17B, the outer sheath layer 28 may protect the pipe segment 20 against penetration of seawater and other external environmental conditions, corrosion, abrasion, and/or mechanical damage. In any case, in some embodiments, the outer sheath layer 28 of a pipe segment 20 may include a number of sublayers.

Furthermore, as depicted, the tubing annulus 25 of the pipe segment 20 is between its internal pressure sheath layer 26 and its outer sheath layer 28. As will be described in more detail below, the tubing annulus 25 of a pipe segment 20 may include one or more intermediate layers. Additionally, as depicted, annular gaps 24 running along the length of the pipe segment 20 are defined in the tubing annulus 25.

However, in other embodiments, a pipe segment 20 may include fewer than two (e.g., one) or more than two (e.g., three, four, or more) annular gaps 24 defined in its tubing annulus 25. Additionally, in other embodiments, an annular gap 24 defined in the tubing annulus 25 of a pipe segment 20 may run non-parallel to the pipe bore 32 of the pipe segment 20, for example, such that the annular gap 24 is skewed relative to the longitudinal axis of the pipe bore 32.

Figure 3:
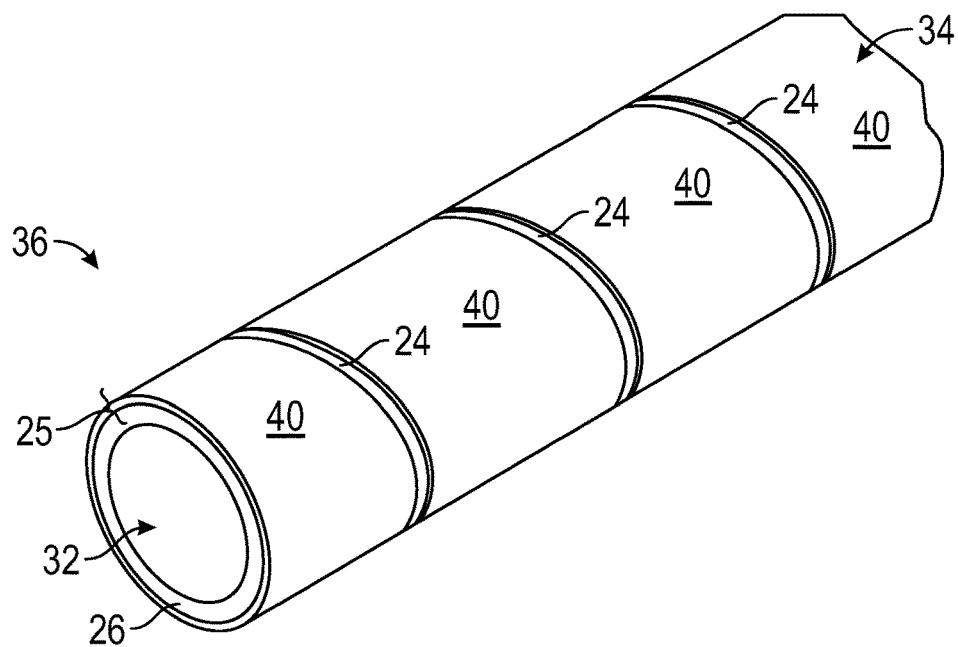
FIG. 3 is an example of a portion of the pipe segment of FIG. 2 with one or more reinforcement layers which may also define one or more helically shaped fluid conduits within the annulus of its tubing, in accordance with an embodiment of the present disclosure.

To help illustrate, an example of a portion 36 of a pipe segment 20, which includes an internal pressure sheath layer 26 and an intermediate layer—namely a reinforcement (e.g., tensile and/or armor) layer 34—included in the annulus 25 of its pipe segment tubing 22, is shown in FIG. 3. However, it should be appreciated that, in other embodiments, the intermediate layers of pipe segment tubing 22 may include one or more tape layers, one or more insulation layers one or more intermediate sheath layers, one or more anti-wear layers, or any combination thereof.

As depicted, the reinforcement layer 34 includes a reinforcement strip 40. To improve tensile strength and/or hoop strength of pipe segment tubing 22, in some embodiments, a reinforcement strip 40 in the pipe segment tubing 22 may be made at least in part using solid material that has a higher tensile strength and/or a higher linear modulus of elasticity than solid material that is used to make the internal pressure sheath layer 26 and/or the outer sheath layer 28 of the pipe segment tubing 22. For example, the internal pressure sheath layer 26 may be made using plastic, such as high-density polyethylene (HDPE), while the reinforcement strip 40 may be made using metal, such as carbon steel, stainless steel, duplex stainless steel, super duplex stainless steel, or any combination thereof. In other words, at least in some such embodiments, a reinforcement strip 40 of the pipe segment tubing 22 may be made from electrically conductive material, which, at least in some instances, may enable communication of electrical (e.g., control and/or sensor) signals via the reinforcement strip 40. However, in other embodiments, one or more reinforcement strips 40 of pipe segment tubing 22 may be made at least in part using a composite material.

Additionally, the reinforcement strip 40 is helically disposed (e.g., wound and/or wrapped) on the internal pressure sheath layer 26 such that gaps (e.g., openings) are left between adjacent windings to define an annular gap (e.g., fluid conduit) 24. In other words, in some embodiments, the reinforcement layer 34 may be made at least in part by winding the reinforcement strip 40 around the internal pressure sheath layer 26 at a non-zero lay angle (e.g., fifty-two degrees) relative to the longitudinal axis of the pipe bore 32. In any case, as depicted, the resulting annular gap 24 runs helically along the pipe segment 20, for example, such that the annular gap 24 is skewed fifty-two degrees relative to the longitudinal axis of the pipe bore 32.

Nevertheless, in some embodiments, one or more other intermediate layers, such as an anti-wear layer, may be included in the annulus 25 of pipe segment tubing 22. In other words, in such embodiments, a reinforcement strip 40 of the reinforcement layer 34 may be disposed on another intermediate layer, for example, instead of directly on the internal pressure sheath layer 26 of the pipe segment tubing 22. Moreover, in other embodiments, a reinforcement layer 34 of pipe segment tubing 22 may include multiple reinforcement strips 40.

In any case, in some embodiments, an outer sheath layer 28 may be disposed directly over the depicted reinforcement layer 34 and, thus, cover the depicted annular gap 24. However, in other embodiments, the tubing annulus 25 of pipe segment tubing 22 may include multiple (e.g., two, three, four, or more) reinforcement layers 34. In other words, in such embodiments, one or more other reinforcement layers 34 may be disposed over the depicted reinforcement layer 34. In fact, in some such embodiments, the reinforcement strips 40 in the one or more other reinforcement layers 34 may also each be helically disposed such that there are annular gaps (e.g., fluid conduits and/or free space) 24 between adjacent windings.

For example, a first other reinforcement strip 40 of a first other reinforcement layer 34 may be helically disposed on the depicted reinforcement strip 40 using the same non-zero lay angle as the depicted reinforcement strip 40 to cover (e.g., enclose) the depicted annular gap 24 and to define another annular gap 24 in the first other reinforcement layer 34. Additionally, a second other reinforcement strip 40 of a second other reinforcement layer 34 may be helically disposed on the first other reinforcement strip 40 using another non-zero lay angle, which may be at or near the inverse of the non-zero lay angle of the depicted reinforcement strip 40, to define another annular gap 24 in the second other reinforcement layer 34. Furthermore, a third other reinforcement strip 40 of a third other reinforcement layer 34 may be helically disposed on the second other reinforcement strip 40 using the same non-zero lay angle as the second other reinforcement strip 40 to cover the other annular gap 24 in the second other reinforcement layer 34 and to define another annular gap 24 in the third other reinforcement layer 34. In some embodiments, an outer sheath layer 28 may be disposed over the third other reinforcement layer 34 and, thus, cover (e.g., enclose) the other annular gap 24 in the third other reinforcement layer 34.

In any case, in some instances, a pipe segment 20 may be deployed in an elevated pressure environment, for example, underwater in a subsea application. To improve the collapse and/or crush resistance of its tubing 22, a carcass layer may be disposed within (e.g., under) the internal pressure sheath layer 26 of the pipe segment 20. In other words, in such instances, the internal pressure sheath layer 26 may be disposed around (e.g., over) the carcass layer and, thus, the carcass layer may be the innermost layer of the pipe segment tubing 22.

Figure 4:
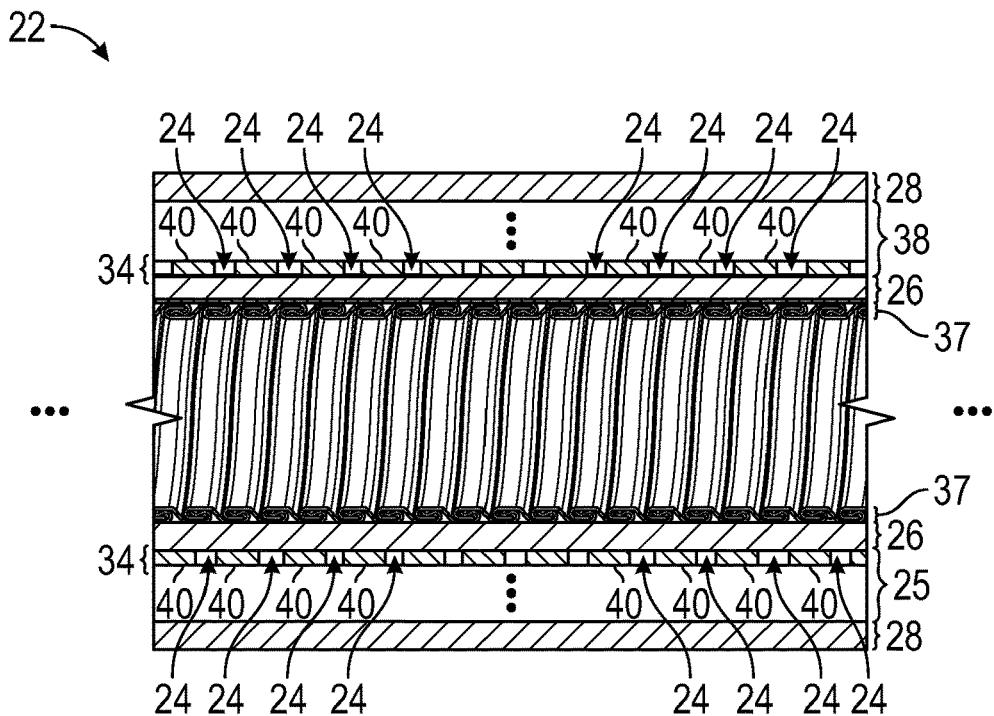
FIG. 4 is an axial cross-section profile of an example of a pipe segment that includes a carcass layer, in accordance with an embodiment of the present disclosure.

To help illustrate, an example of pipe segment tubing 22 that includes a carcass layer 37 is shown in FIG. 4. To improve collapse and/or crush resistance, in some embodiments, the carcass layer 37 may be made from metal, such as carbon steel, stainless steel, duplex stainless steel, super duplex stainless steel, or any combination thereof. Additionally, as depicted, the carcass layer 37 is an interlocked layer in the pipe segment tubing 22.

In addition to the carcass layer 37, as depicted, the pipe segment tubing 22 includes an internal pressure sheath layer 26 and an outer sheath layer 28. Furthermore, as depicted, the pipe segment tubing 22 includes intermediate layers 38 disposed between the internal pressure sheath layer 26 and the outer sheath layer 28 and, thus, in the annulus 25 of the pipe segment tubing 22. As depicted, the intermediate layers 38 include at least a reinforcement layer 34 with one or more reinforcement strips 40 that define one or more annular gaps (e.g., fluid conduits and/or free space) 24 in the tubing annulus 25.

In some embodiments, the intermediate layers 38 of pipe segment tubing 22 may include one or more tape layers, one or more intermediate sheath layers, one or more anti-wear layers, one or more insulation layers, or any combination thereof. Additionally, as described above, in some embodiments, pipe segment tubing 22 may include multiple reinforcement layers 34, which each include one or more reinforcement strips 40. In any case, in a pipeline system 10, the tubing 22 of a pipe segment 20 may be secured and sealed in a pipe fitting 18.

Figure 5:
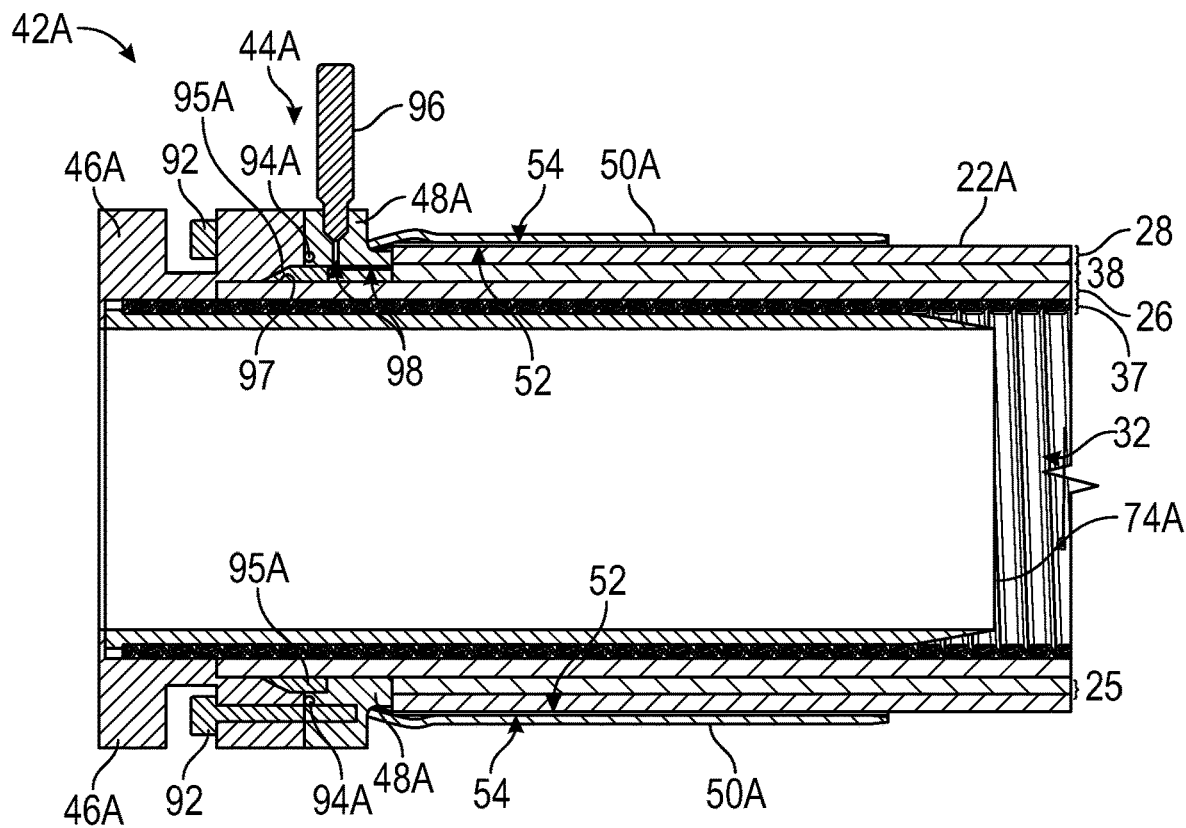
FIG. 5 is an axial cross-section profile of a portion of a pipeline system that includes an example of a swaged pipe fitting and a pipe segment, in accordance with an embodiment of the present disclosure.

To help illustrate, a portion 42A of a pipeline system 10, which includes an example of a pipe fitting 18—namely a swaged pipe fitting 44A—and pipe segment tubing 22A, is shown in FIG. 5. As in the depicted example, a swaged pipe fitting 44 may include a fitting body 48, which defines a body (e.g., fitting) bore, a fitting connector (e.g., flange or weldneck) 46, and a fitting jacket 50. The fitting connector 46 may be secured to the fitting body 48 to enable the swaged pipe fitting 44 to be connected to another pipeline component, such as a fluid source 12, a fluid destination 14, or another pipe fitting 18.

Additionally, to facilitate securing a swaged pipe fitting 44 to pipe segment tubing 22, a fitting jacket 50 of the swaged pipe fitting 44 may be secured (e.g., welded) to its fitting body 48. To facilitate securing the swaged pipe fitting 44A to the pipe segment tubing 22A, the fitting jacket 50A of the swaged pipe fitting 44A may be compressed radially inward such that an inner surface 52 of the fitting jacket 50A engages (e.g., grips) an outer surface 54 of the pipe segment tubing 22A, for example, via a swage machine secured to the swaged pipe fitting 44A. In other words, the fitting jacket 50A is shown in its swaged state in FIG. 5. Before being swaged, a fitting jacket 50 may be in an unswaged state in which its inner surface diameter is larger than the outer surface diameter of corresponding pipe segment tubing 22, thereby enabling the pipe segment tubing 22 to be inserted under (e.g., within) the fitting jacket 50.

Figure 6:
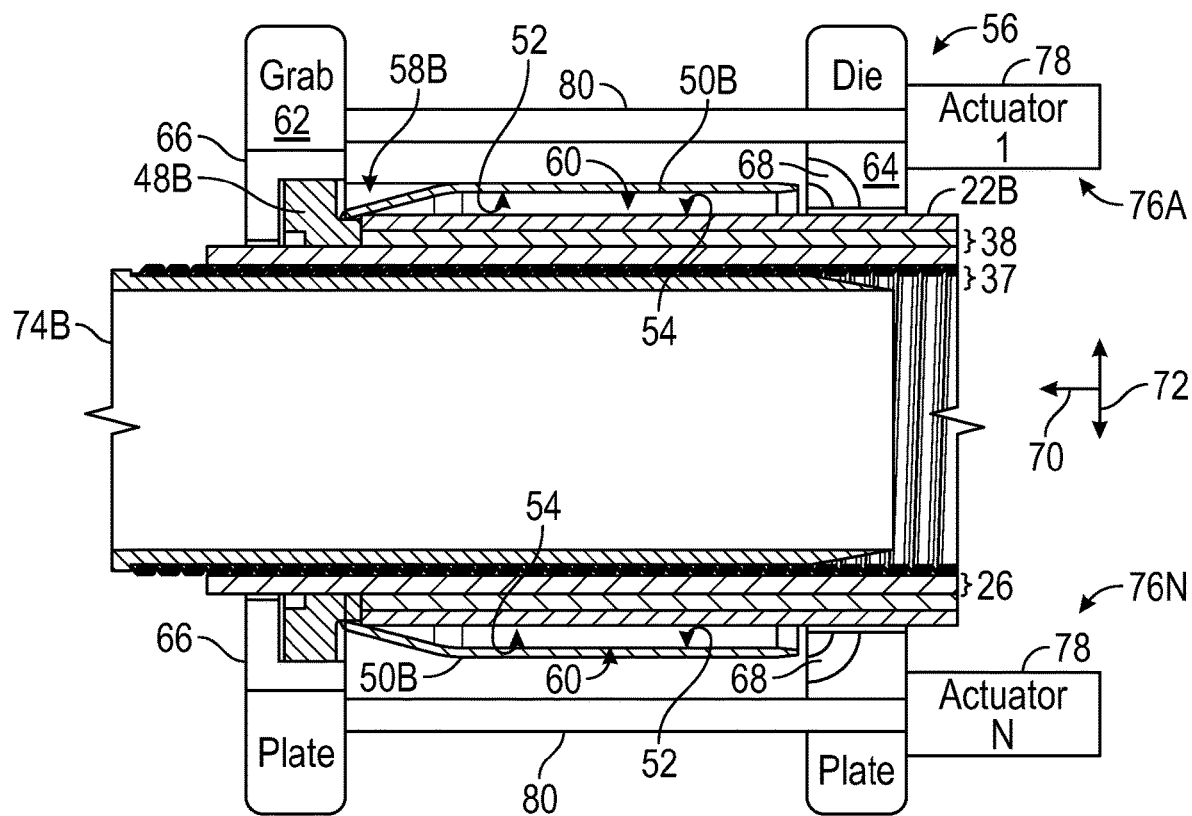
FIG. 6 is an axial cross-section profile of a swage machine and a portion of a swaged pipe fitting, in accordance with an embodiment of the present disclosure.

To help further illustrate, an example of a swage machine 56 and a portion 58B of a swaged pipe fitting 44 are shown in FIG. 6. As depicted, open space 60 is present between the inner surface 52 of the fitting jacket 50B and the outer surface 54 of the pipe segment tubing 22B, thereby enabling the pipe segment tubing 22B to be inserted (e.g., disposed) under (e.g., within) the fitting jacket 50B. In other words, the fitting jacket 50B is shown in its unswaged state in FIG. 6.

To transition a fitting jacket 50 from its unswaged state to its swaged state, a swage machine 56 may include a grab plate 62 and a die plate 64. The grab plate 62 may include a grab attachment 66 with an L-shaped axial cross-section profile, which may interlock with an end of the fitting body 48 of a swaged pipe fitting 44. In other words, the grab plate 62 of a swage machine 56 may generally facilitate securing the swage machine 56 to a swaged pipe fitting 44.

Additionally, as depicted, the die plate 64 of a swage machine 56 may have a set of die segments 68 loaded therein. In particular, the set of die segments 68 may be loaded into the die plate 64 such that the set of die segments 68 open toward the grab plate 62 of the swage machine 56. When compressed against a fitting jacket 50 of a swaged pipe fitting 44 in an axial direction 70 toward the grab plate 62, the die segments 68 may compress the fitting jacket 50 inward in a radial direction 72 around the circumference, for example, such that the inner surface 52 of the fitting jacket 50 engages the outer surface 54 of pipe segment tubing 22 disposed thereunder.

To facilitate preserving the pipe bore 32 defined by pipe segment tubing 22 during a swaging operation, as in the depicted example, in some embodiments, a swaged pipe fitting 44 may include a support cylinder 74, which is disposed directly adjacent to an innermost (e.g., carcass) layer of the pipe segment tubing 22. In the depicted example, the support cylinder 74B of the swaged pipe fitting 44 is disposed under (e.g., within) the carcass layer 37 of the pipe segment tubing 22B. To facilitate supporting pipe segment tubing 22 during a swaging operation, the support cylinder 74 of a swaged pipe fitting 44 may extend beyond both ends of a corresponding fitting jacket 50. Additionally, due to a fitting jacket 50 being swaged, one or more intermediate (e.g., reinforcement) layers 38 of pipe segment tubing 22 may be compressed between the fitting jacket 50 and the support cylinder 74 of a swaged pipe fitting 44, thereby anchoring the one or more intermediate layers 38 in the swaged pipe fitting 44. Furthermore, due to swaging, the fitting jacket 50 of a swaged pipe fitting 44 may engage the outer sheath layer 28 of a pipe segment 20 and, thus, block the ingress of external environmental fluids, such as seawater into the tubing annulus 25 of the pipe segment 20, thereby sealing the outer sheath layer 28 of the pipe segment 20.

Moreover, as will be described in more detail below, in some embodiments, the support cylinder 74 of a swaged pipe fitting 44 may include threading on its outer surface. In particular, in such embodiments, the threading on the outer surface of the support cylinder 74 may threadingly interlock with the inner surface of the carcass layer 37 of a corresponding pipe segment 20. Thus, in such embodiments, the support cylinder 74 may anchor the carcass layer 37 in the swaged pipe fitting 44. However, in other embodiments, the support cylinder 74 of a swaged pipe fitting 44 may not include threading, for example, instead having a smooth, knurled, serrated or other outer surface condition.

In any case, as will be described in more detail below, in other embodiments, the support cylinder 74 of a swaged pipe fitting 44 may be integrated with its fitting connector 46 or its fitting body 48, for example, instead of being a separate component. Alternatively, as will be described in more detail below, in other embodiments, a swaged pipe fitting 44 may not include a support cylinder 74, for example, when a support cylinder tool is used instead.

To compress a set of die segments 68 against a fitting jacket 50 in an axial direction 70, as depicted, a swage machine 56 may include one or more swaging actuators 76. In the depicted example, the swage machine 56 includes a first swaging actuator 76A and an Nth swaging actuator 76N. In some embodiments, one or more swaging actuators 76 in a swage machine 56 may be a fluid actuator, such as a hydraulic actuator or a pneumatic actuator. Each swaging actuator 76 of the swage machine 56 includes an actuator cylinder 78 and an actuator piston 80, which selectively extends out from the actuator cylinder 78 based at least in part on the supply of fluid (e.g., liquid and/or gas) to the actuator cylinder 78 and/or selectively retracts into the actuator cylinder 78 based at least in part on the extraction of fluid from the actuator cylinder 78.

In the depicted example, the actuator cylinder 78 of each swaging actuator 76 is secured to the die plate 64 of the swage machine 56. Additionally, in the depicted example, the actuator piston 80 of each swaging actuator 76 extends through the die plate 64 and is secured to the grab plate 62 of the swage machine 56. As such, to perform a swaging operation, one or more swaging actuators 76 in the swage machine 56 may be operated to pull the grab plate 62 toward the die plate 64 via one or more reverse (e.g., retracting) strokes such that the fitting jacket 50B moves through the set of die segments 68 loaded in the die plate 64. In this manner, a swage machine 56 may be operated to transition a fitting jacket 50 of a swaged pipe fitting 44 from its unswaged state to its swaged state and, thus, securing the swaged pipe fitting 44 to pipe segment tubing 22 inserted under the fitting jacket 50.

However, it should be noted that the techniques described in the present disclosure are not limited to a specific configuration of a swage machine 56. For example, in other embodiments, a swage machine 56 may include fewer than two (e.g., one) swaging actuators 76 or more than two (e.g., three, four, or more) swaging actuators 76. Additionally, in other embodiments, a swage machine 56 may be operated to push its die plate 64 toward its grab plate 62 via one or more forward (e.g., extending) strokes such that a corresponding fitting jacket 50 moves through the set of die segments 68 loaded in the die plate 64. Furthermore, in other embodiments, a swaged pipe fitting 44 may be swaged as a whole. Moreover, to improve securement strength, in some embodiments, a swaged pipe fitting 44 may include a grab sleeve, which may be disposed between the internal pressure sheath layer 26 and an intermediate layer 38 of pipe segment tubing 22 before a fitting jacket 50 of the swaged pipe fitting 44 is swaged around the pipe segment tubing 22.

Figure 7:
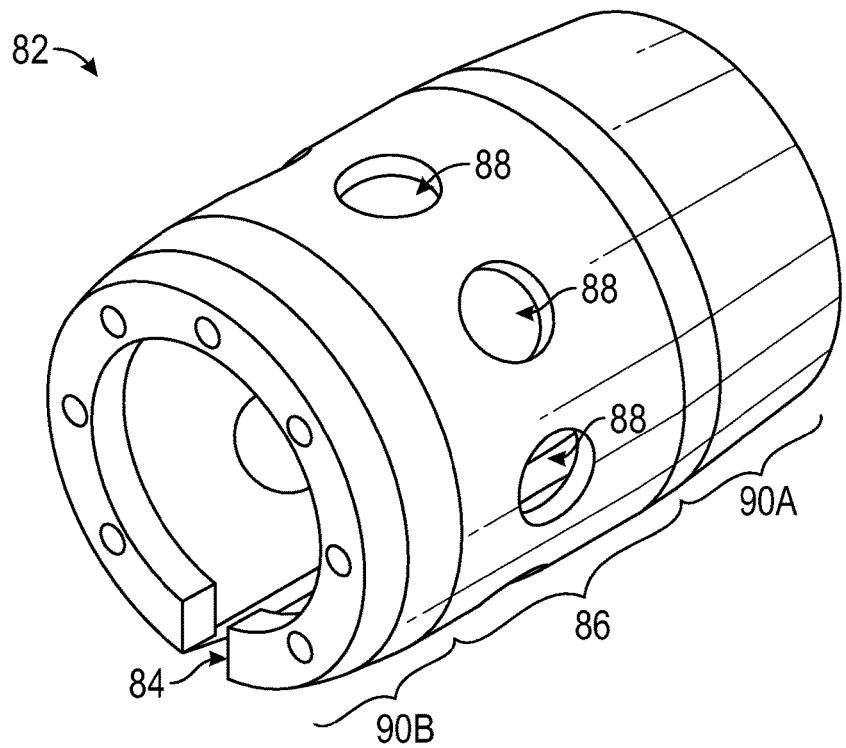
FIG. 7 is a perspective view of a grab sleeve that may be included in a swaged pipe fitting, in accordance with an embodiment of the present disclosure.

To help illustrate, an example of a grab sleeve 82, which may be included in a swaged pipe fitting 44, is shown in FIG. 7. As mentioned above, a grab sleeve 82 may be disposed between the internal pressure sheath layer 26 and an intermediate (e.g., reinforcement) layer 38 of pipe segment tubing 22. In some embodiments, the grab sleeve 82 may be made from material that is more rigid than material used to make the internal pressure sheath layer 26 of the pipe segment tubing 22. For example the grab sleeve 82 may be made from metal, such as carbon steel, stainless steel, duplex stainless steel, super duplex stainless steel, or any combination thereof.

Additionally, as depicted, the grab sleeve 82 includes a slit 84 along its longitudinal axis. Thus, during swaging, the grab sleeve 82 may contract radially inward and engage the internal pressure sheath layer 26 of pipe segment tubing 22. Due to the resulting increased thickness, the grab sleeve 82 may facilitate anchoring an intermediate layer 38 (e.g., reinforcement layer 34) of the pipe segment tubing 22 between the grab sleeve 82 and a fitting jacket 50 of a corresponding swaged pipe fitting 44.

To facilitate contraction around the internal pressure sheath layer 26 of pipe segment tubing 22, in some embodiments, a grab sleeve 82 may include a crumple zone 86. The crumple zone 86 may include multiple openings 88 formed through the grab sleeve 82. To facilitate insertion between the internal pressure sheath layer 26 and an intermediate layer 38 of pipe segment tubing 22, in some embodiments, a grab sleeve 82 may include a first tapered end 90A and a second tapered end 90B.

However, in other embodiments, a grab sleeve 82 may not include a tapered end 90 or include a single tapered end 90. Additionally, in other embodiments, a grab sleeve 82 may not include a dedicated crumple zone 86. Alternatively, in other embodiments, a swaged pipe fitting 44 may not include a grab sleeve 82.

In any case, returning to the swaged pipe fitting 44A of FIG. 5, after the support cylinder 74A is inserted and the fitting jacket 50A is swaged, the fitting connector 46A may be secured to the fitting body 48A. As in the depicted example, in some embodiments, the fitting connector 46 of a swaged pipe fitting 44 may be secured to a corresponding fitting body 48 via one or more threaded fasteners 92, such as a bolt or a screw.

However, in other embodiments, the fitting connector 46 of a swaged pipe fitting 44 may be secured to a corresponding fitting body 48 via fewer than two (e.g., one) threaded fasteners 92 or more than two (e.g., three, four, or more) threaded fasteners 92. Alternatively, in other embodiments, the fitting connector 46 of a swaged pipe fitting 44 may be secured to a corresponding fitting body 48 via hot tooling, such as welding or brazing.

In any case, to facilitate sealing pipe segment tubing 22 therein, a swaged pipe fitting 44 may include fitting seals. The fitting seals of a swaged pipe fitting 44 may include one or more face seals 94, which may be compressed between components of the swaged pipe fitting 44. For example, a face seal 94A of the swaged pipe fitting 44A may be compressed between its fitting connector 46A and its fitting body 48A.

In addition to a face seal 94, in some embodiments, the fitting seals of a swaged pipe fitting 44 may include one or more internal pressure sheath seals 95, which may be compressed against the internal pressure sheath layer 26 of a pipe segment 20, thereby sealing the internal pressure sheath layer 26 and, thus, block fluid flow between the pipe bore 32 and the tubing annulus 25 of the pipe segment 20. For example, an internal pressure sheath seal 95A of the swaged pipe fitting 44A may be compressed against the internal pressure sheath layer 26 of the pipe segment tubing 22A due to compression between the fitting body 48A and the fitting connector 46A of the swaged pipe fitting 44A. To enable an internal pressure sheath seal 95 to be compressed against an outer surface 97 of the internal pressure sheath layer 26 of pipe segment tubing 22, as in the depicted example, the outer sheath layer 28 and each intermediate layer 38 of the pipe segment tubing 22 may be cut back relative to the internal pressure sheath layer 26, for example, while the internal pressure sheath layer 26 is cut back relative to the carcass layer 37 of the pipe segment tubing 22.

Furthermore, in some embodiments, one or more fitting seals in a swaged pipe fitting 44 may be made from metal. For example, a fitting seal in the swaged pipe fitting 44 may made from carbon steel, stainless steel, duplex stainless steel, super duplex stainless steel, or any combination thereof. However, in other embodiments, one or more fitting seals in a swaged pipe fitting 44 may be made from a non-metallic material. For example, in such embodiments, a fitting seal in the swaged pipe fitting 44 may made from a polymer, rubber, and/or plastic.

In any case, as described above, one or more intermediate layers 38 in a pipe segment 20 may define one or more annular gaps (e.g., fluid conduits and/or free space) 24 in its tubing annulus 25. To facilitate venting the annulus 25 of pipe segment tubing 22, as in the depicted example, in some embodiments, a swaged pipe fitting 44 may include one or more vent valves 96. As in the depicted example, a vent valve 96 of a swaged pipe fitting 44 may be fluidly connected to the annulus 25 of pipe segment tubing 22 via a fluid path 98 formed through the fitting body 48 of the swaged pipe fitting 44.

However, in other embodiments, a swaged pipe fitting 44 may not include a vent valve 96 or include more than one (e.g., two, three, or more) vent valve 96. In other words, it should be appreciated that the various examples described in the present disclosure may or may not include a vent valve 96. Additionally, as will be described in more detail below, in other embodiments, an internal pressure sheath seal 95 of a swaged pipe fitting 44 may have a different geometry, such as a J-shaped axial cross-section profile, and/or disposed under a fitting jacket 50 of the swaged pipe fitting 44. Furthermore, in other embodiments, a swaged pipe fitting 44 may include a carcass ring—namely a carcass isolating ring, which electrically isolates the carcass layer 37 of pipe segment tubing 22, or a carcass anchoring ring, which anchors the carcass layer 37 in the swaged pipe fitting 44.

Figure 8:
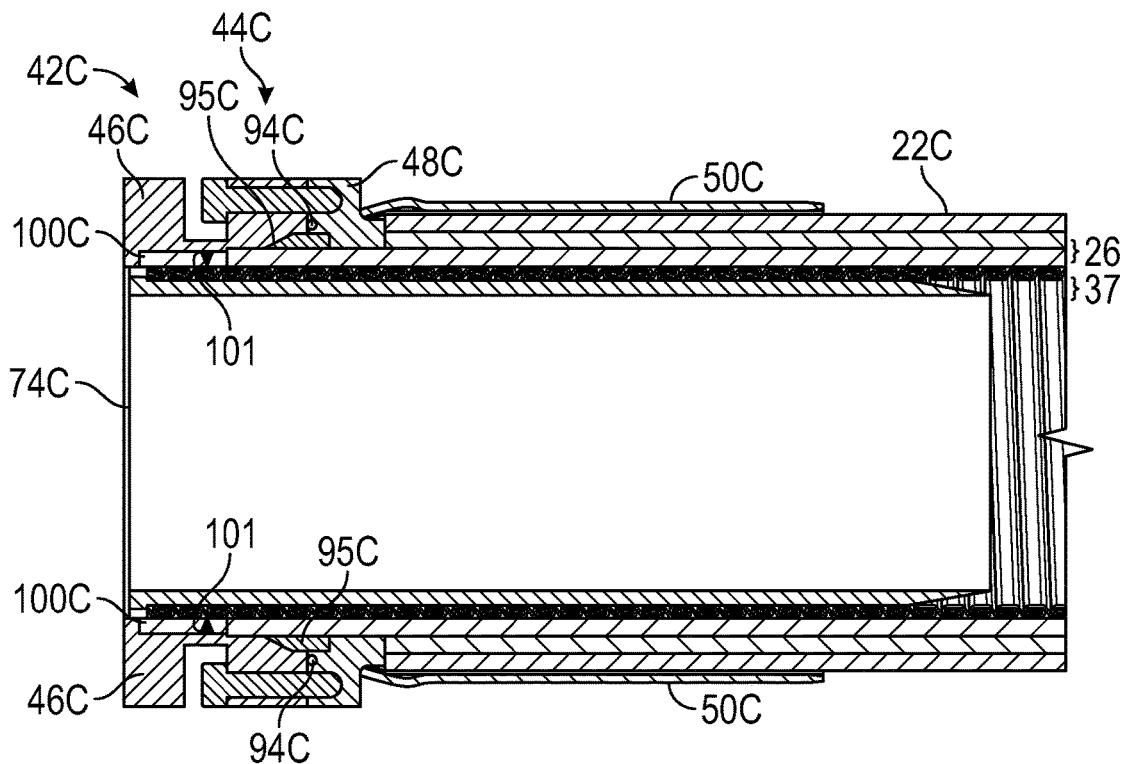
FIG. 8 is an axial cross-section profile of a portion of a pipeline system that includes another example of a swaged pipe fitting and a pipe segment, in accordance with an embodiment of the present disclosure.

To help illustrate, a portion 42C of a pipeline system 10, which includes another example of a swaged pipe fitting 44C and pipe segment tubing 22C, is shown in FIG. 8. Similar to FIG. 5, as depicted, the swaged pipe fitting 44C of FIG. 8 generally includes a fitting body 48C, a fitting connector 46C, a fitting jacket 50C, which is shown in its swaged state, a support cylinder 74C, and fitting seals—namely a face seal 94C and an internal pressure sheath seal 95C.

However, as depicted in FIG. 8, the swaged pipe fitting 44C includes a carcass anchoring ring 100C, which is secured to the outer surface 101 of the carcass layer 37 of the pipe segment tubing 22C. In some embodiments, the carcass anchoring ring 100 of a swaged pipe fitting 44 may be threaded and/or welded onto an outer surface of a corresponding carcass layer 37, which is an interlocked metal layer. Thus, to anchor the carcass layer 37 in some embodiments, the carcass anchoring ring 100 may be made from metal, such as carbon steel, stainless steel, duplex stainless steel, super duplex stainless steel, or any combination thereof. Additionally, to enable a carcass anchoring ring 100 to be secured to the outer surface 101 of the carcass layer 37 of pipe segment tubing 22, as in the depicted example, the internal pressure sheath layer 26 of the pipe segment tubing 22 may be cut back relative to the carcass layer 37.

As depicted in FIG. 8, the fitting connector 46C of the swaged pipe fitting 44C accommodates the carcass anchoring ring 100C. Thus, the carcass anchoring ring 100C may be secured to the carcass layer 37 of the pipe segment tubing 22C before the fitting connector 46C is secured to the fitting body 48C. After the fitting connector 46C is secured to the fitting body 48C, the carcass anchoring ring 100C, which is secured to the carcass layer 37 of the pipe segment tubing 22C, may be trapped between the fitting connector 46C and the internal pressure sheath layer 26 of the pipe segment tubing 22C. Since the carcass layer 37 is anchored by the carcass anchoring ring 100C, in some embodiments, the support cylinder 74C may have a smooth, knurled, or serrated outer surface, for example, instead of threading. In any case, in this manner, a swaged pipe fitting 44 may separately anchor the carcass layer 37 of corresponding pipe segment tubing 22 in the swaged pipe fitting 44.

Nevertheless, in some embodiments, the swaged pipe fitting 44C may include one or more vent valves 96 and corresponding fluid paths 98 formed in its fitting body 48C. Additionally, in other embodiments, the swaged pipe fitting 44C may not include a support cylinder 74C, for example, when a support cylinder tool is used instead. Furthermore, in other embodiments, a swaged pipe fitting 44 may include a seal flange, which is secured between its fitting connector 46 and its fitting body 48, for example, to improve sealing integrity of the swaged pipe fitting 44. Moreover, in such embodiments, the swaged pipe fitting 44 may trap its carcass anchoring ring 100 between its fitting connector 46 and its seal flange, for example, to improve anchoring strength.

Figure 9:
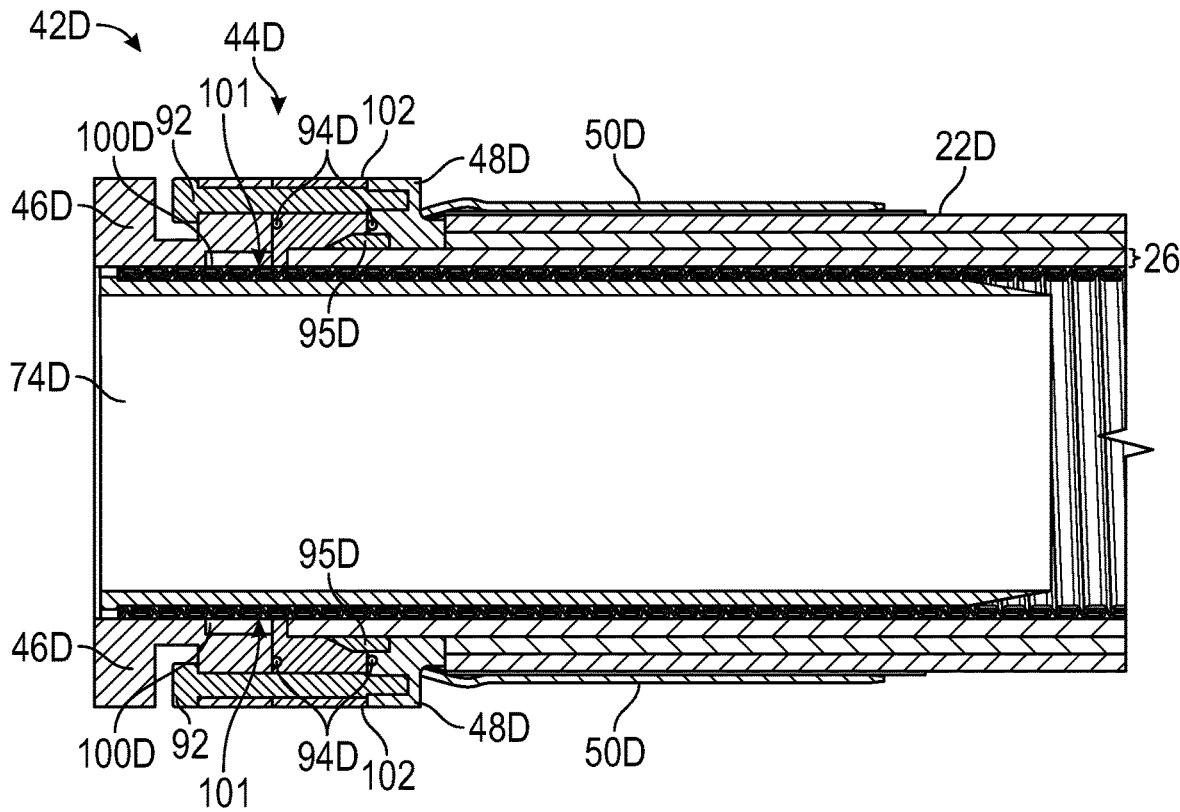
FIG. 9 is an axial cross-section profile of a portion of a pipeline system that includes a further example of a swaged pipe fitting and a pipe segment, in accordance with an embodiment of the present disclosure.

To help illustrate, a portion 42D of a pipeline system 10, which includes a further example of a swaged pipe fitting 44D and pipe segment tubing 22D, is shown in FIG. 9. Similar to FIG. 8, as depicted, the swaged pipe fitting 44D of FIG. 9 generally includes a fitting body 48D, a fitting connector 46D, a fitting jacket 50D, which is shown in its swaged state, a support cylinder 74D, an carcass anchoring ring 100D, and fitting seals—namely face seals 94D and an internal pressure sheath seal 95D.

However, as depicted in FIG. 9, the swaged pipe fitting 44D includes a seal flange 102, which is secured between its fitting connector 46D and its fitting body 48D, for example, via one or more threaded fasteners 92, such as a bolt or a screw. As in the depicted example, the seal flange 102 of a swaged pipe fitting 44 may be secured to a corresponding fitting body 48D such that a face seal 94 is compressed therebetween and secured to a corresponding fitting connector 46 such that another face seal 94 is compressed therebetween. Additionally, as in the depicted example, the seal flange 102 of a swaged pipe fitting 44 may be secured to a corresponding fitting body 48 such that an internal pressure sheath seal 95 is compressed against the internal pressure sheath layer 26 of pipe segment tubing 22.

Nevertheless, similar to FIG. 8, as depicted in FIG. 9, the fitting connector 46D accommodates the carcass anchoring ring 100D. However, as depicted in FIG. 9, after the fitting connector 46D is secured to the seal flange 102, the carcass anchoring ring 100D is trapped between the fitting connector 46D and the seal flange 102, for example, instead of between the fitting connector 46D and the internal pressure sheath layer 26 of the pipe segment tubing 22D. Since the seal flange 102 is generally made from material, such as metal, that is more rigid than the internal pressure sheath layer 26 of pipe segment tubing 22, at least in some instances, implementing and/or deploying a swaged pipe fitting 44 in this manner may improve the strength with which the carcass layer 37 of the pipe segment tubing 22 is anchored in the swaged pipe fitting 44. Additionally, since the carcass layer 37 is anchored by the carcass anchoring ring 100D, in some embodiments, the support cylinder 74D may have a smooth, knurled or serrated outer surface, for example, instead of threading.

In any case, is some embodiments, the swaged pipe fitting 44D may include one or more vent valves 96 and corresponding fluid paths 98 formed in its fitting body 48D. Additionally, in other embodiments, the swaged pipe fitting 44D may not include a support cylinder 74C, for example, when a support cylinder tool is used instead. Furthermore, in other embodiments, the seal flange 102 may be secured to the fitting body 48D via a first one or more threaded fasteners 92 while the fitting connector 46D is secured to the seal flange 102 via a second one or more threaded fasteners 92. Moreover, in other embodiments, the carcass anchoring ring 100 of a swaged pipe fitting 44 may be disposed under a fitting jacket 50 of the swaged pipe fitting 44. Additionally, as mentioned above, in other embodiments, an internal pressure sheath seal 95 of a swaged pipe fitting 44 may have a different geometry, such as a J-shaped axial cross-section profile.

Figure 10:
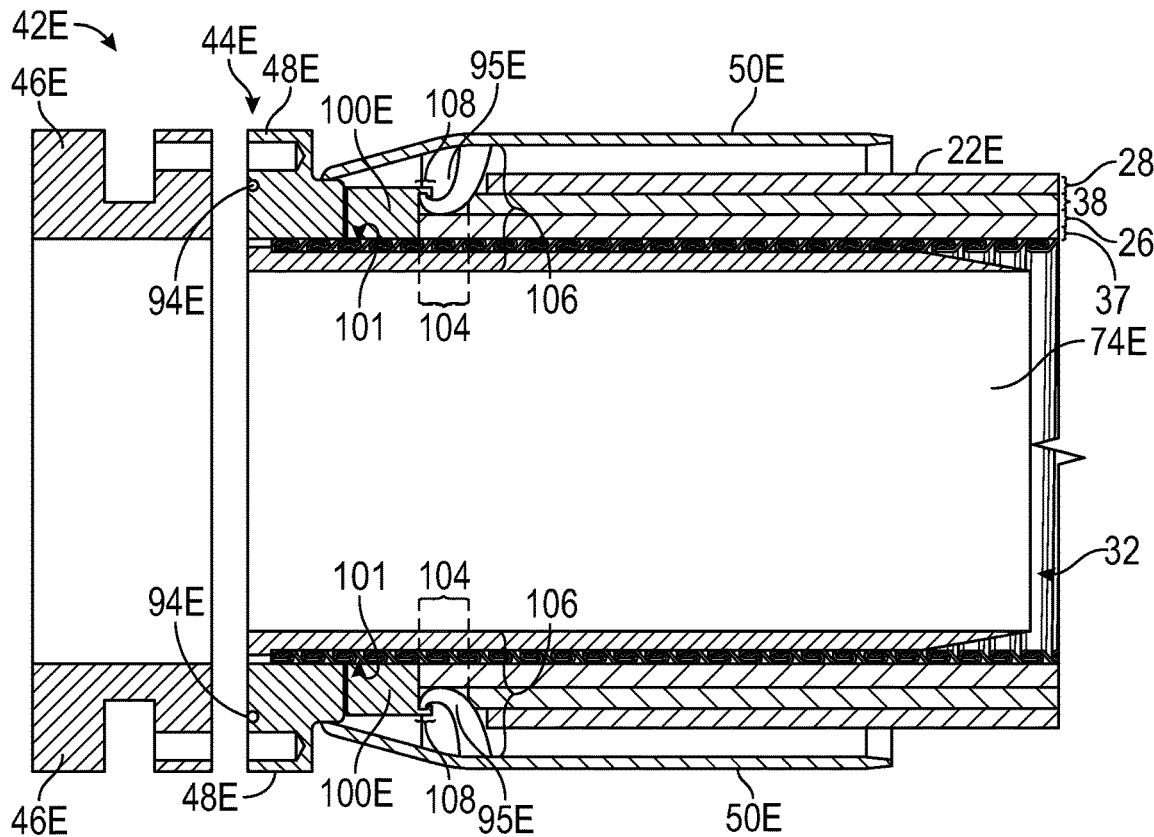
FIG. 10 is an axial cross-section profile of a portion of a pipeline system that includes another example of a swaged pipe fitting and a pipe segment, in accordance with an embodiment of the present disclosure.

To help illustrate, a portion 42E of a pipeline system 10, which includes another example of a swaged pipe fitting 44E and pipe segment tubing 22E, is shown in FIG. 10. Similar to FIG. 8, as depicted, the swaged pipe fitting 44E of FIG. 10 generally includes a fitting body 48E, a fitting connector 46E, a fitting jacket 50E, which is shown in its unswaged state, a support cylinder 74E, a carcass anchoring ring 100E, and fitting seals—namely a face seal 94E and an internal pressure sheath seal 95E.

However, as depicted in FIG. 10, the carcass anchoring ring 100E of the swaged pipe fitting 44E is disposed under its fitting jacket 50E. Nevertheless, as depicted, the carcass anchoring ring 100E is secured to the outer surface 101 of the carcass layer 37 of the pipe segment tubing 22E. For example, the carcass anchoring ring 100E may be secured to the carcass layer 37 of the pipe segment tubing 22 at least in part by welding and/or threading the carcass anchoring ring 100E to the outer surface 101 of the carcass layer 37.

Moreover, as depicted in FIG. 10, the internal pressure sheath seal 95E of the swaged pipe fitting 44E is disposed under the fitting jacket 50E and has a J-shaped axial cross-section profile, for example, instead of a wedge-shaped axial cross-section profile. In other words, as depicted, the internal pressure sheath seal 95E includes a hook portion 104 and a leg portion 106. The hook portion 104 of the internal pressure sheath seal 95E matingly interlocks with a retainer lip 108 on the carcass anchoring ring 100E to secure the internal pressure sheath seal 95E to the carcass anchoring ring 100E.

Additionally, as depicted, the leg portion 106 of the internal pressure sheath seal 95E slants against the pipe segment tubing 22E. To enable an internal pressure sheath seal 95 to slant against pipe segment tubing 22, as in the depicted example, the outer sheath layer 28 of the pipe segment tubing 22 may be cut back relative to each intermediate layer 38 of the pipe segment tubing 22 while each intermediate layer 38 may be cut back relative to the internal pressure sheath layer 26 of the pipe segment tubing 22. Since disposed under the fitting jacket 50E, when the fitting jacket 50E is swaged, the internal pressure sheath seal 95E may be compressed radially inward against the internal pressure sheath layer 26 of the pipe segment tubing 22E, thereby sealing the internal pressure sheath layer 26.

In other embodiments, the swaged pipe fitting 44E may include one or more vent valves 96 and corresponding fluid paths 98 formed in its fitting body 48E. Additionally, in other embodiments, the swaged pipe fitting 44E may not include a support cylinder 74C, for example, when a support cylinder tool is used instead. Furthermore, in other embodiments, the fitting body 48 of a swaged pipe fitting 44 may be integrated with a corresponding fitting connector 46, such as a flange. Furthermore, in other embodiments, an internal pressure sheath seal 95 of a swaged pipe fitting 44 may have a different geometry, such as a U-shaped axial cross-section profile, and/or be compressed between the fitting body 48 and the support cylinder 74 of the swaged pipe fitting 44.

Figure 11:
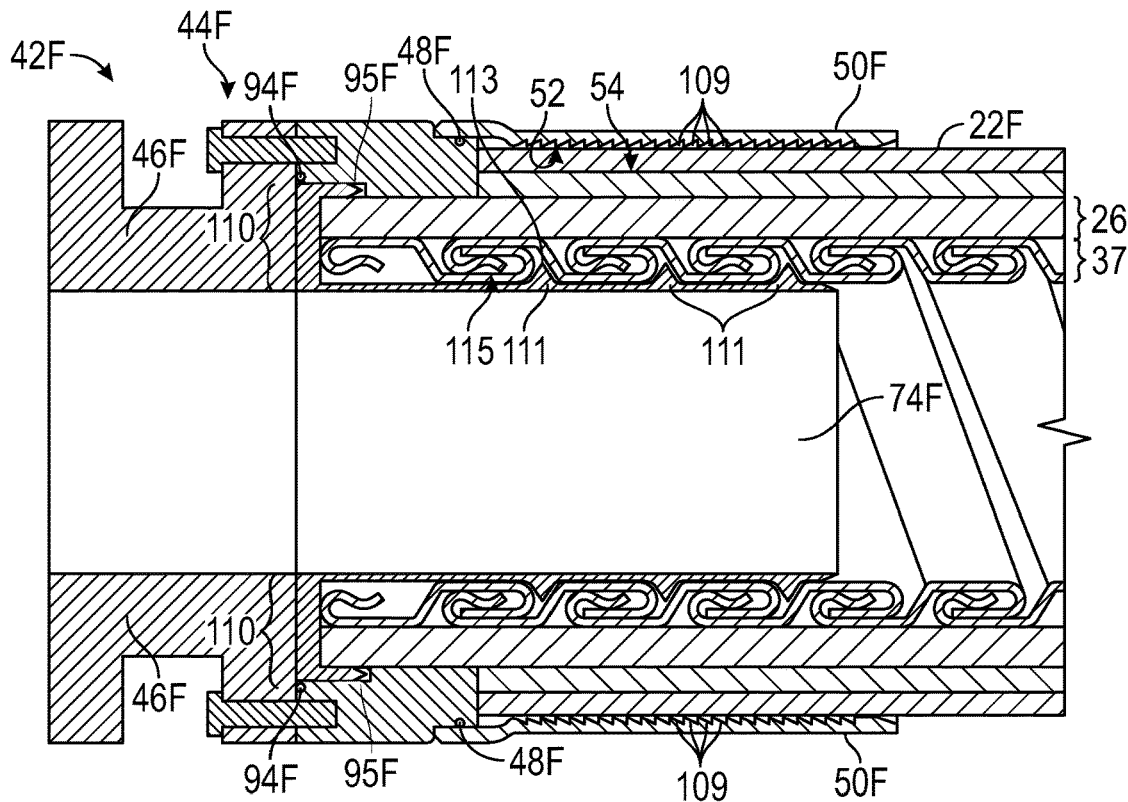
FIG. 11 is an axial cross-section profile of a portion of a pipeline system that includes a further example of a swaged pipe fitting and a pipe segment, in accordance with an embodiment of the present disclosure.

To help illustrate, a portion 42F of a pipeline system 10, which includes a further example of a swaged pipe fitting 44F and pipe segment tubing 22F, is shown in FIG. 11. Similar to FIG. 5, as depicted, the swaged pipe fitting 44F of FIG. 11 generally includes a fitting body 48F, a fitting connector 46F, a fitting jacket 50F, which is shown in its swaged state, a support cylinder 74F, and fitting seals—namely face seals 94F and an internal pressure sheath seal 95F.

However, as depicted in FIG. 11, the internal pressure sheath seal 95F of the swaged pipe fitting 44F has a U-shaped axial cross-section profile, for example, instead of a wedge-shaped axial cross-section profile or a J-shaped axial cross-section profile. Additionally, as depicted, the support cylinder 74F of the swaged pipe fitting 44F includes a flange 110, which extends radially outward, for example, instead of into the fitting connector 46F. As depicted, the internal pressure sheath seal 95F is compressed against the internal pressure sheath layer 26 of the pipe segment tubing 22F due to compression between the flange 110 of the support cylinder 74D and the fitting body 48F of the swaged pipe fitting 44F, for example, instead of due to compression directly between the fitting body 48F and the fitting connector 46F of the swaged pipe fitting 44F.

Additionally, as in the depicted example, to anchor the carcass layer 37 of pipe segment tubing 22 in a swaged pipe fitting 44, in some embodiments, a support cylinder 74 of the swaged pipe fitting 44 may include threading 111 that extends outwardly along its outer surface 113. As in the depicted example, the threading 111 on the support cylinder 74 may threadingly engage an inner surface 115 of the carcass layer 37 of pipe segment tubing 22, thereby securing the support cylinder 74 to the carcass layer 37. In other words, in such embodiments, the support cylinder 74 may be disposed under the carcass layer 37 of the pipe segment tubing 22 at least in part by rotating the support cylinder 74 relative to the carcass layer 37. In fact, due to the threading engagement, internal pressure sheath seal 95F may be activated at least in part by securing the support cylinder 74F to the carcass layer 37 of the pipe segment tubing 22F.

However, in other embodiments, the support cylinder 74F of the swage pipe fitting 44F may have a smooth, serrated or knurled outer surface. Thus, in such embodiments, the internal pressure sheath seal 95F may be activated at least in part by securing the fitting connector 46F to the fitting body 48F, for example, due to the flange 110 of the support cylinder 74F being disposed therebetween.

In any case, as in the depicted example, to improve securement strength, in some embodiments, a swaged pipe fitting 44 may include teeth (e.g., serrations) 109 that extend radially inward from the inner surface 52 of its fitting jacket 50. Additionally, as in the depicted example, in addition to a face seal 94 compressed between its fitting connector 46 and its fitting body 48, in some embodiments, a swaged pipe fitting 44 may include another face seal 94 disposed between the fitting body 48 and a fitting jacket 50.

In other embodiments, the swaged pipe fitting 44F may include one or more vent valves 96 and corresponding fluid paths 98 formed in its fitting body 48E. Additionally, in other embodiments, the internal pressure sheath seal 95F may have a wedge-shaped axial cross-section profile, for example, instead of a U-shaped axial cross-section profile. Furthermore, in other embodiments, the support cylinder 74 of a swaged pipe fitting 44 may be integrated with the fitting connector 46 of the swaged pipe fitting 44.

Figure 12:
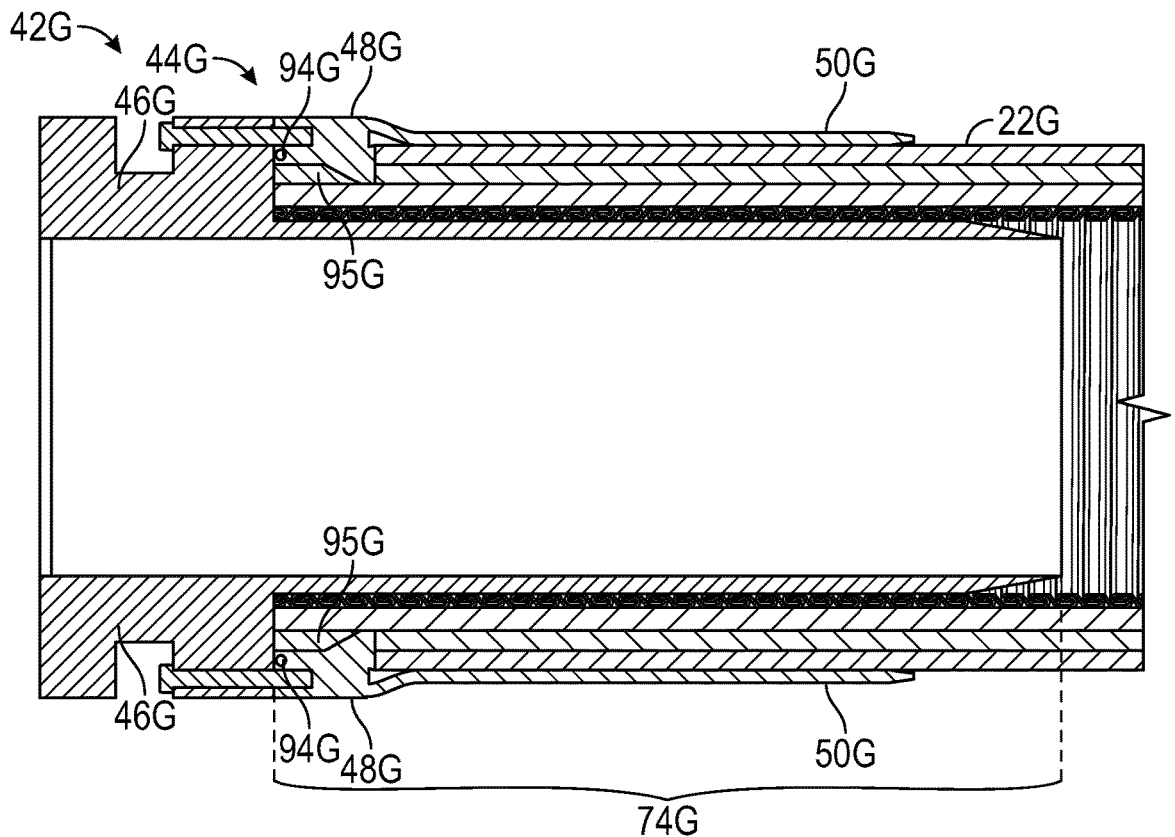
FIG. 12 is an axial cross-section profile of a portion of a pipeline system that includes another example of a swaged pipe fitting and a pipe segment, in accordance with an embodiment of the present disclosure.

To help illustrate, a portion 42G of a pipeline system 10, which includes another example of a swaged pipe fitting 44G and pipe segment tubing 22G, is shown in FIG. 12. Similar to FIG. 5, as depicted, the swaged pipe fitting 44G of FIG. 12 generally includes a fitting body 48G, a fitting connector 46G, a fitting jacket 50G, which is shown in its swaged state, and fitting seals—namely a face seal 94G and an internal pressure sheath seal 95G.

However, as depicted in FIG. 12, a support cylinder feature 74G of the swaged pipe fitting 44G is integrated with its fitting connector 46G. In other words, to support pipe segment tubing 22 during swaging, in such embodiments, the fitting connector 46 of a swaged pipe fitting 44 may be inserted into the pipe segment tubing 22 before a fitting jacket 50 of the swaged pipe fitting 44 is swaged (e.g., conformally deformed) around the pipe segment tubing 22. Nevertheless, in some such embodiments, the fitting connector 46 may be secured to the fitting body 48 of the swaged pipe fitting 44 after the fitting jacket 50 is swaged around the pipe segment tubing 22.

In other embodiments, the swaged pipe fitting 44G may include one or more vent valves 96 and corresponding fluid paths 98 formed in its fitting body 48G. Additionally, in other embodiments, the support cylinder 74 of a swaged pipe fitting 44 may be integrated with the fitting body 48 of the swaged pipe fitting 44.

Figure 13:
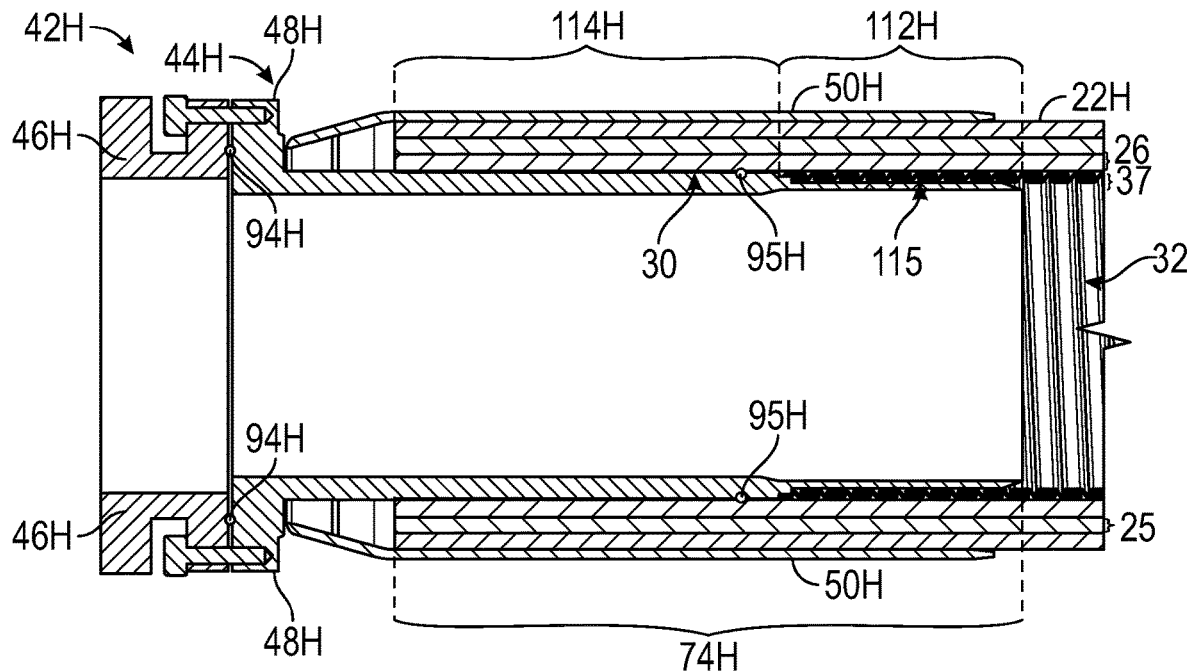
FIG. 13 is an axial cross-section profile of a portion of a pipeline system that includes a further example of a swaged pipe fitting and a pipe segment, in accordance with an embodiment of the present disclosure.

To help illustrate, a portion 42H of a pipeline system 10, which includes a further example of a swaged pipe fitting 44H and pipe segment tubing 22H, is shown in FIG. 13. Similar to FIG. 5, as depicted, the swaged pipe fitting 44H of FIG. 13 generally includes a fitting body 48H, a fitting connector 46H, a fitting jacket 50H, which is shown in its swaged state, and fitting seals—namely a face seal 94H and an internal pressure sheath seal 95H.

However, as depicted in FIG. 13, a support cylinder feature 74H of the swaged pipe fitting 44H is integrated with the fitting body 48H. In other words, to support pipe segment tubing 22 during swaging, in such embodiments, the fitting body 48 of a swaged pipe fitting 44 may be inserted into the pipe segment tubing 22 before a fitting jacket 50 of the swaged pipe fitting 44 is swaged (e.g., conformally deformed) around the pipe segment tubing 22. Additionally, as depicted, the support cylinder feature 74H includes a carcass support section 112H, which supports the carcass layer 37 of the pipe segment tubing 22H, and an internal pressure sheath support section 114H, which supports the internal pressure sheath layer 26 of the pipe segment tubing 22H. To enable the internal pressure sheath support section 114 of a swaged pipe fitting 44 to support the internal pressure sheath layer 26 of pipe segment tubing 22, as in the depicted example, the carcass layer 37 of the pipe segment tubing 22 may be cut back relative to the internal pressure sheath layer 26.

In fact, since internal pressure sheath support section 114H is disposed directly under the internal pressure sheath layer 26, swaging the fitting jacket 50H around the pipe segment tubing 22H may compress the internal pressure sheath layer 26 against the internal pressure sheath support section 114H, thereby sealing the internal pressure sheath layer 26. To improve sealing integrity, in some embodiments, the swaged pipe fitting 44H may nevertheless include a discrete internal pressure sheath seal 95H, which may be compressed between the internal pressure sheath support section 114H and the internal pressure sheath layer 26. In some such embodiments, the discrete internal pressure sheath seal 95H may be an O-ring seal or a belt (e.g., flat) seal. However, in other embodiments, the discrete internal pressure sheath seal 95H may be obviated by the seal provided between the internal pressure sheath support section 114H and the internal pressure sheath layer 26 and, thus, not be included in the swaged pipe fitting 44H.

To anchor the carcass layer 37 in the swaged pipe fitting 44H, in some embodiments, the carcass support section 112H may include threading on its outer surface, for example, which threadingly engages an inner surface 115 of the carcass layer 37 of the pipe segment tubing 22H. Additionally, to anchor the pipe segment tubing 22H in the swaged pipe fitting 44H, in some embodiments, the internal pressure sheath support section 114H may include teeth on its inner surface, for example, which engages the inner surface 30 of the internal pressure sheath layer 26. However, in other embodiments, the carcass support section 112H may have a smooth outer surface, the internal pressure sheath support section 114H may have a smooth outer surface, or both.

In any case, in other embodiments, the swaged pipe fitting 44H may include one or more vent valves 96 and corresponding fluid paths 98 formed in its fitting body 48H. Additionally, to account for thickness difference, in some embodiments, the fitting jacket 50H may have a stepped geometry such that the portion of the fitting jacket 50H that overlaps with the carcass support section 112H may be thinner while the portion of the fitting jacket 50H that overlaps with the internal pressure sheath support section 114H may be thicker. Furthermore, in other embodiments, the fitting body 48 of a swaged pipe fitting 44 may be integrated with a corresponding fitting connector 46, such as a weldneck. Alternatively, in other embodiments, a swaged pipe fitting 44 may not include a fitting connector 46. Moreover, in other embodiments, the internal pressure sheath support section 114 and the carcass support section 112 of a swaged pipe fitting 44 may be separate components.

Figure 14:
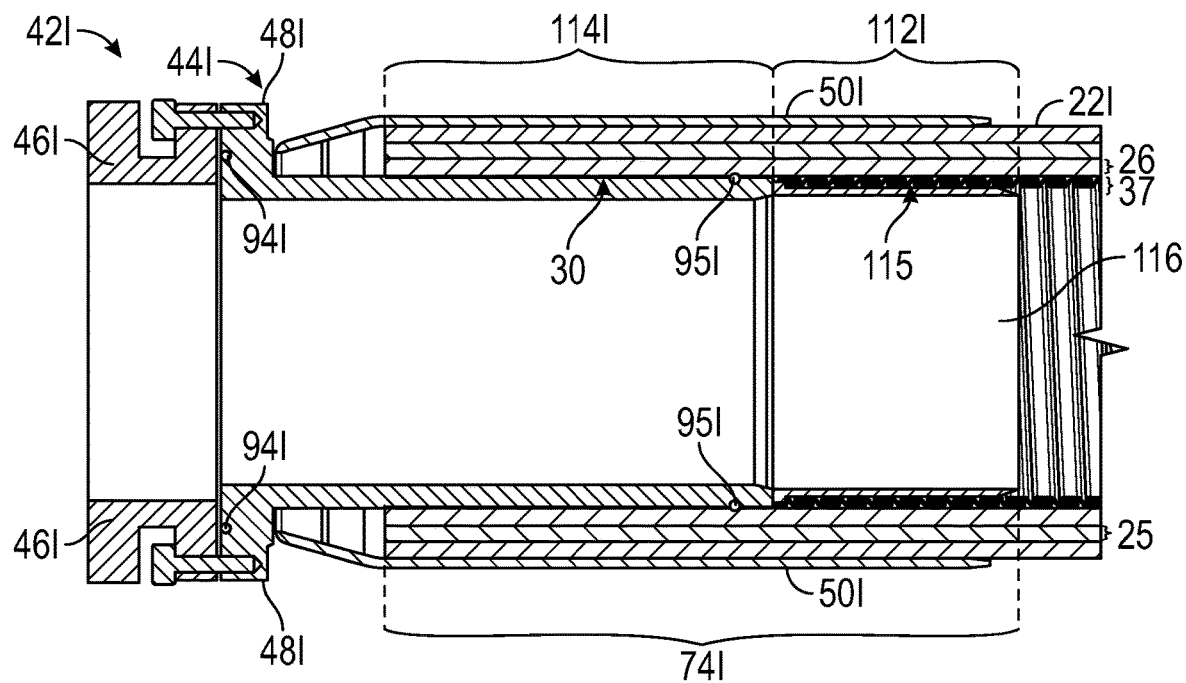
FIG. 14 is an axial cross-section profile of a portion of a pipeline system that includes another example of a swaged pipe fitting and a pipe segment, in accordance with an embodiment of the present disclosure.

To help illustrate, a portion 42I of a pipeline system 10, which includes another example of a swaged pipe fitting 44I and pipe segment tubing 22I, is shown in FIG. 14. Similar to FIG. 13, as depicted, the swaged pipe fitting 44I of FIG. 14 generally includes a fitting body 48I, a fitting connector 46I, a fitting jacket 50I, which is shown in its swaged state, and fitting seals—namely a face seal 94I and an internal pressure sheath seal 95I.

However, as depicted in FIG. 14, the carcass support section 112I of the support cylinder feature 74I is implemented using a separate carcass support cylinder 116, for example, instead of being integrated with the internal pressure sheath support section 114I and the fitting body 48I of the swaged pipe fitting 44I. In other words, to support pipe segment tubing 22 during swaging, in such embodiments, the carcass support cylinder 116 of the swaged pipe fitting 44 may be inserted into the pipe segment tubing 22 followed by the fitting body 48 of the swaged pipe fitting 44 before a fitting jacket 50 of the swaged pipe fitting 44 is swaged (e.g., conformally deformed) around the pipe segment tubing 22. Nevertheless, similar to FIG. 13, to enable the internal pressure sheath support section 114I of the swaged pipe fitting 44I to support the internal pressure sheath layer 26 of the pipe segment tubing 22E, as depicted in FIG. 14, the carcass layer 37 of the pipe segment tubing 22E is cut back relative to the internal pressure sheath layer 26.

To improve sealing integrity, in some embodiments, the swaged pipe fitting 44I may nevertheless include a discrete internal pressure sheath seal 95I, which may be compressed between the internal pressure sheath support section 114I and the internal pressure sheath layer 26. In some such embodiments, the discrete internal pressure sheath seal 95I may be an O-ring seal or a belt (e.g., flat) seal. However, in other embodiments, the discrete internal pressure sheath seal 95I may be obviated by the seal provided between the internal pressure sheath support section 114I and the internal pressure sheath layer 26 and, thus, not be included in the swaged pipe fitting 44I.

In any case, to anchor the carcass layer 37 in the swaged pipe fitting 44I, in some embodiments, the carcass support cylinder 116 may include threading on its outer surface, for example, which threadingly engages an inner surface 115 of the carcass layer 37 of the pipe segment tubing 22I. Additionally, to anchoring the pipe segment tubing 22I in the swaged pipe fitting 44I, in some embodiments, the internal pressure sheath support section 114I may include teeth on its inner surface, for example, which engages the inner surface 30 of the internal pressure sheath layer 26. However, in other embodiments, the carcass support section 112I may have a smooth outer surface, the internal pressure sheath support section 114I may have a smooth outer surface, or both.

Additionally, in other embodiments, the swaged pipe fitting 44I may include one or more vent valves 96 and corresponding fluid paths 98 formed in its fitting body 48I. Furthermore, to account for thickness difference, in some embodiments, the fitting jacket 50I may have a stepped geometry such that the portion of the fitting jacket 50I that overlaps with the carcass support section 112I may be thinner while the portion of the fitting jacket 50H that overlaps with the internal pressure sheath support section 114I is thicker. Moreover, although support cylinders 74 disposed under the carcass layer 37 of pipe segment tubing 22 are described above, in other embodiments, a swaged pipe fitting 44 may include a support cylinder 74, which is disposed around (e.g., over) the carcass layer 37 of pipe segment tubing 22.

Figure 15:
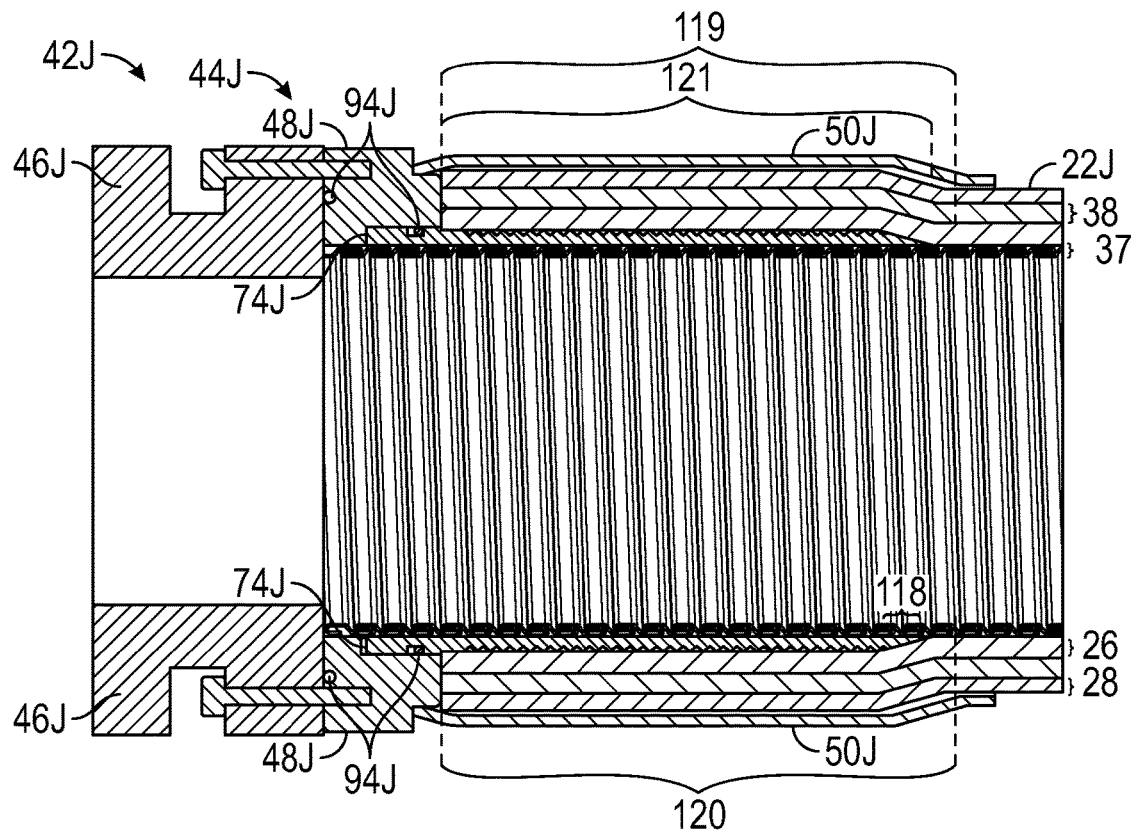
FIG. 15 is an axial cross-section profile of a portion of a pipeline system that includes a further example of a swaged pipe fitting and a pipe segment, in accordance with an embodiment of the present disclosure.

To help illustrate, a portion 42J of a pipeline system 10, which includes a further example of a swaged pipe fitting 44J and pipe segment tubing 22J, is shown in FIG. 15. Similar to FIG. 5, as depicted, the swaged pipe fitting 44J of FIG. 15 generally includes a fitting body 48J, a fitting connector 46J, a fitting jacket 50J, which is shown in its swaged state, a support cylinder 74J, and face seals 94J.

However, as depicted in FIG. 15, the support cylinder 74J of the swaged pipe fitting 44J is disposed around (e.g., over) the carcass layer 37 of the pipe segment tubing 22J, for example, instead of under the carcass layer 37. In other words, the support cylinder 74J may be inserted (e.g., disposed) between the carcass layer 37 and the internal pressure sheath layer 26 of the pipe segment tubing 22J. To facilitate insertion, as in the depicted example, in some embodiments, the support cylinder 74 of a swaged pipe fitting 44 may include a tapered end 118.

Additionally, as depicted, inserting the support cylinder 74J under the internal pressure sheath layer 26 of the pipe segment tubing 22J may produce a flared section 119 in the internal pressure sheath layer 26 and a flared section 120 in each intermediate layer 38 of the pipe segment tubing 22J. As depicted, a flared section 121 in the outer sheath layer 28 of the pipe segment tubing 22J also overlaps with the support cylinder 74J. In some embodiments, the flared section 121 in the outer sheath layer 28 may also be produced by insertion of the support cylinder 74J under the internal pressure sheath layer 26.

However, in other embodiments, the flared section 121 in the outer sheath layer 28 of the pipe segment tubing 22J may be produced using a separate installation sleeve. In such embodiment, before the support cylinder 74J is inserted, the installation sleeve may be inserted (e.g., disposed) between the outer sheath layer 28 and an intermediate layer 38 of the pipe segment tubing 22J to produce the flared section 121 in the outer sheath layer 28. The flared section 121 of the outer sheath layer 28 may then be cut off from a remaining portion of the outer sheath layer 28 and the installation sleeve may be removed to enable the internal pressure sheath layer 26 and each intermediate layer 38 of the pipe segment tubing 22J to expand radially outward to produce flared sections therein when the support cylinder 74J is inserted under the internal pressure sheath layer 26. Before the fitting jacket 50J is disposed around the pipe segment tubing 22J, in such embodiments, the flared section 121 of the outer sheath layer 28 may be reattached (e.g., poly welded) to the remaining portion of the outer sheath layer 28. In fact, to improve fitting integrity, as in the depicted example, the fitting jacket 50 of a swaged pipe fitting 44 may be implemented to extend beyond a flared section 121 in the outer sheath layer 28 of corresponding pipe segment tubing 22 and, thus, beyond the location the flared section 121 of the outer sheath layer 28 is reattached to the remaining portion of the outer sheath layer 28. However, in other embodiments, the fitting jacket 50J may not extend beyond the flared section 121 in the outer sheath layer 28.

However, in other embodiments, the swaged pipe fitting 44J may include one or more vent valves 96 and corresponding fluid paths 98 formed in its fitting body 48J. Additionally, in other embodiments, the swaged pipe fitting 44J may anchor the carcass layer 37 of pipe segment tubing 22 therein via a carcass ring 100 similar to FIG. 8 or FIG. 9. Furthermore, as mentioned above, in other embodiments, a swaged pipe fitting 44 may not include a support cylinder 74.

Figure 16:
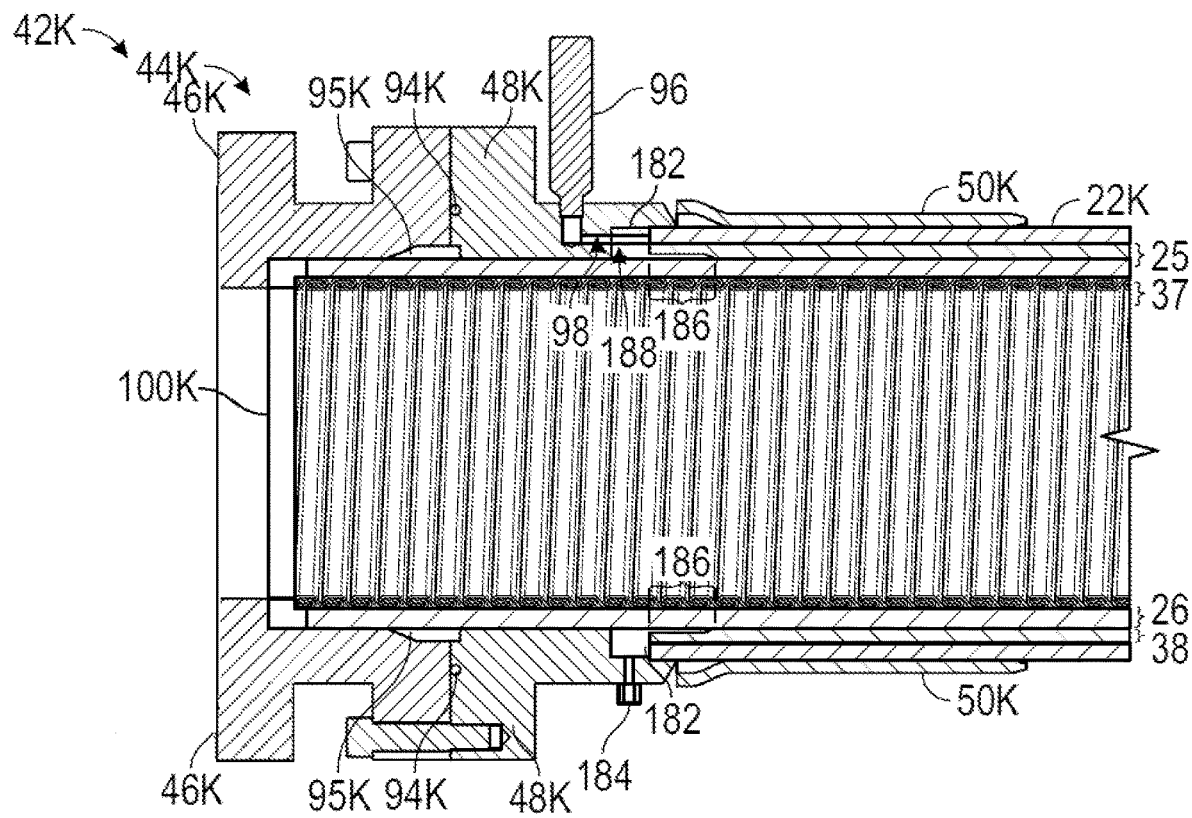
FIG. 16 is an axial cross-section profile of a portion of a pipeline system that includes another example of a swaged pipe fitting and a pipe segment, in accordance with an embodiment of the present disclosure.

To help illustrate, a portion 42K of a pipeline system 10, which includes another example of a swaged pipe fitting 44K and pipe segment tubing 22K, is shown in FIG. 16. Similar to FIG. 5, as depicted in FIG. 16, the swaged pipe fitting 44K generally includes a fitting body 48K, a fitting connector 46K, a fitting jacket 50K, which is shown in its swaged state, a vent valve 96, and fitting seals—namely a face seal 94K and an internal pressure sheath seal 95K.

However, as depicted in FIG. 16, the swaged pipe fitting 44K does not include a permanent support cylinder 74. Instead, in such embodiments, a support cylinder tool may be used to support pipe segment tubing 22 during swaging. In such embodiments, the support cylinder tool may be inserted into the pipe segment tubing 22 while in a contracted state and, subsequently, transitioned to an expanded state such that an outer surface of the support cylinder tool expands (e.g., is compressed) against and, thus, directly abuts an inner surface of the pipe segment tubing 22. After swaging, the support cylinder tool may then be transitioned from its expanded state back to its contracted state and withdrawn from within the pipe segment tubing 22. In other words, in such embodiments, the support cylinder tool may act as a temporary support cylinder 74. For example, in some such embodiments, the support cylinder tool used with a swaged pipe fitting 44 may be an inflatable packer. However, in other such embodiments, the support cylinder tool used with a swaged pipe fitting 44 may be a special-purpose tool.

Figure 17:
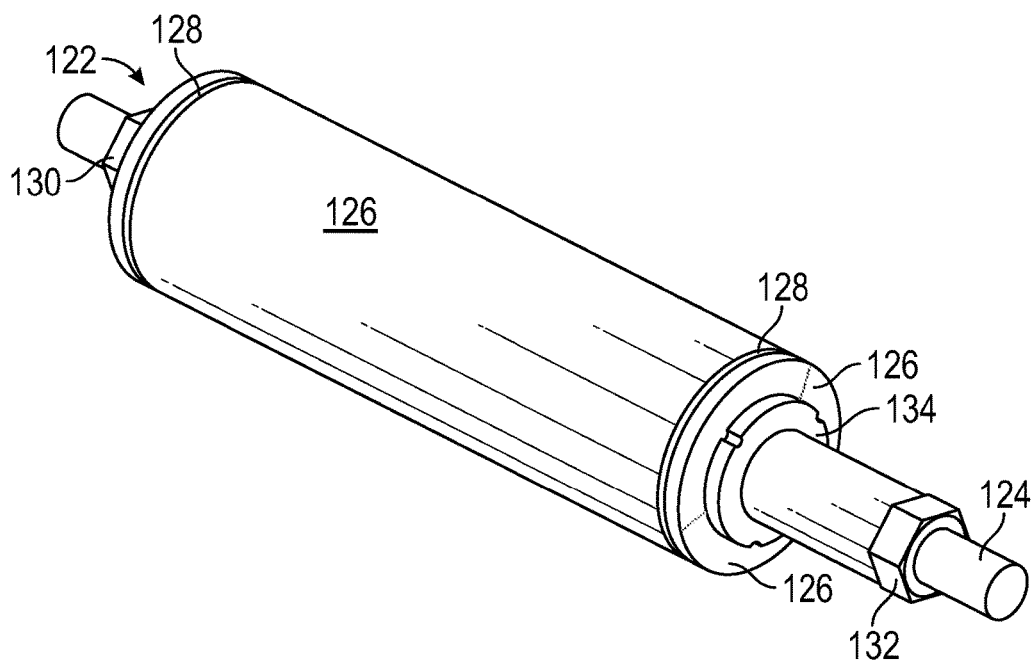
FIG. 17 is a perspective view of an example of a support cylinder tool that may be used to support a pipe segment during swaging, in accordance with an embodiment of the present disclosure.

To help illustrate, an example of a special-purpose support cylinder tool 122 is shown in FIG. 17. As depicted, the support cylinder tool 122 generally includes a threaded shaft 124, multiple support cylinder sections 126 disposed circumferentially around the threaded shaft 124, metallic elastic bands 128 disposed circumferentially around the support cylinder sections 126, an outer stationary nut 130 disposed around the threaded shaft 124, and an activation nut 132 disposed around the threaded shaft 124. Although partially obfuscated from view, the support cylinder tool 122 includes an activation collar 134, which is disposed between the support cylinder sections 126 and the activation nut 132, as well as a stationary collar, which is disposed between the outer stationary nut 130 and the support cylinder sections 126.

Figure 18:
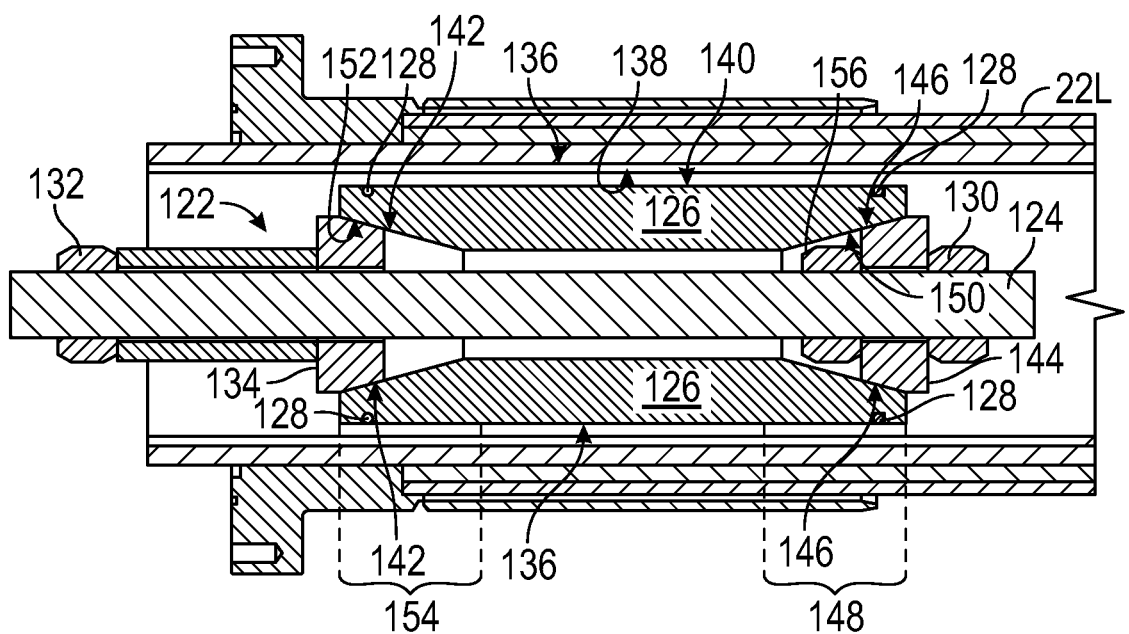
FIG. 18 is an axial cross-section profile of the support cylinder tool of FIG. 17 disposed within a pipe segment, in accordance with an embodiment of the present disclosure.

To more clearly illustrate, an example of a support cylinder tool 122 disposed within pipe segment tubing 22L is shown in FIG. 18. As depicted, open space 136 is present between an inner surface 138 of the pipe segment tubing 22L and an outer surface 140 of the support cylinder sections 126 of the support cylinder tool 122. In other words, in FIG. 18, the support cylinder tool 122 is shown in a contracted state, which enables the support cylinder tool 122 to be relatively freely inserted into and/or withdrawn from the pipe segment tubing 22L.

To facilitate transitioning a support cylinder tool 122 between its contracted state and its expanded state and, thus, controlling its activation state, as depicted, the activation collar 134 of the support cylinder tool 122 has a wedge-shaped axial cross-section profile and, thus, a conical outer surface 142 while the stationary collar 144 also has a wedge-shaped axial cross-section profile and, thus, a conical outer surface 146. Additionally, as depicted, a first end 148 of the support cylinder sections 126 has a conical inner surface (e.g., female taper) 150, which can slide along the conical outer surface (e.g., male taper) 146 of the stationary collar 144, while the conical outer surface (e.g., male taper) 142 of the activation collar 134 can slide along a conical inner surface (e.g., female taper) 152 at a second (e.g., opposite) end 154 of the support cylinder sections 126. Furthermore, as depicted, the stationary collar 144 is trapped between and, thus, held in place on the threaded shaft 124 of the support cylinder tool 122 via an outer stationary nut 130 and an inner stationary nut 156.

Thus, to transition the support cylinder tool 122 from its contacted state toward its expanded state, the activation nut 132 may be rotated on the threaded shaft 124 to push more of the activation collar 134 under the support cylinder sections 126, thereby pushing the support cylinder sections 126 radially outward. To support the pipe segment tubing 22L during swaging, the activation collar 134 may continue to be pushed under the support cylinder sections 126 until the outer surface 140 of the support cylinder sections 126 expands against the inner surface 138 of the pipe segment tubing 22L. On the other hand, to transition the support cylinder tool 122 from its expanded state toward its contracted state, the activation nut 132 may be rotated on the threaded shaft in an opposite direction to enable the pipe segment tubing 22L to push more of the activation collar 134 out from under the support cylinder sections 126 while contracting radially inward against the support cylinder sections 126.

In other embodiments, a support cylinder tool 122 used with a swaged pipe fitting 44 may include fewer than two (e.g., one) or more than two (e.g., three, four, or more) metallic elastic bands 128 disposed around its support cylinder sections 126. Furthermore, in other embodiments, a support cylinder tool 122 used with a swaged pipe fitting 44 may include fewer than three (e.g., two) support cylinder sections 126 or more than three (e.g., four, five, or more) support cylinder sections 126. In any case, in this manner, a support cylinder tool 122 may be implemented and/or operated to support pipe segment tubing 22 during a swaging operation used to secure a swaged pipe fitting 44 to the pipe segment tubing 22.

Returning to the swaged pipe fitting 44K of FIG. 16, similar to FIG. 5, after the fitting jacket 50K is swaged around the pipe segment tubing 22K, the fitting connector 46K may be secured to the fitting body 48K, for example, after a support cylinder tool 122 is removed from within the pipe segment tubing 22K. As in the depicted example, in some embodiments, a swaged pipe fitting 44 may include a carcass isolating ring 100, which electrically isolates the carcass layer 37 of corresponding pipe segment tubing 22 from the remainder of the swaged pipe fitting 44. To facilitate electrically isolating the carcass layer 37, the carcass isolating ring 100K of the swaged pipe fitting 44K may be made from an electrical insulative material, such as a polymer and/or plastic.

Furthermore, as in the depicted example, in some embodiments, a swaged pipe fitting 44 may include a spacer ring 182. As depicted in the depicted example, the spacer ring 182 may directly abut the internal pressure sheath layer 26 of pipe segment tubing 22 and, thus, supports the internal pressure sheath layer 26, for example, to reduce the likelihood of a blow through in the internal pressure sheath layer 26 occurring within the swaged pipe fitting 44. In other words, the spacer ring 182 may bridge the structural support provided to the internal pressure sheath layer 26 by the one or more intermediate (e.g., reinforcement) layers 38 of the pipe segment tubing 22 and the structural support provided by the fitting body 48 of the swaged pipe fitting 44.

Additionally, as in the depicted example, the spacer ring 182 in a swaged pipe fitting 44 may directly abut an intermediate (e.g., reinforcement) layer 38 in the annulus 25 of pipe segment tubing 22, for example, to enable the swaged pipe fitting 44 to provide electrical continuity and, thus, cathodic protection to the intermediate layer 38. To provide electrical continuity, the spacer ring 182 may be made from the same type of metal as the intermediate layer 38 of the pipe segment tubing 22K. For example, the spacer ring 182 and the intermediate layer 38 may both be made of carbon steel while the fitting body 48K is made of stainless steel. Moreover, to facilitate providing cathodic protection in a swaged pipe fitting 44, as in the depicted example, an electrical terminal 184 may be connected to the spacer ring 182 of the swaged pipe fitting 44 through its fitting body 48, for example, to enable an anode to be electrically connected to the intermediate layer 38 of corresponding pipe segment tubing 22.

In fact, as in the depicted example, to facilitate improving electrical connection with and/or structural support of corresponding pipe segment tubing 22, in some embodiments, the spacer ring 182 of a swaged pipe fitting 44 may include an extension 186, which is disposed under the intermediate layer 38. In other words, as in the depicted example, the extension 186 on the spacer ring 182 may be inserted (e.g., disposed) between the intermediate layer 38 and the internal pressure sheath layer 26 of the pipe segment tubing 22. Furthermore, as in the depicted example, to enable the annulus 25 of pipe segment tubing 22 to be vented, in some embodiments, a fluid path 188 may be formed through the spacer ring 182 of a swaged pipe fitting 44 such that the fluid path 188 can be fluidly connected to another fluid path 98 that is formed in the fitting body 48 of the swaged pipe fitting 44 and fluidly connected to a vent valve 96.

However, in other embodiments, the swaged pipe fitting 44K may not include a vent valve 96 or include more than one (e.g., two, three, or more) vent valves 96. Additionally, in other embodiments, the swaged pipe fitting 44K may not include a spacer ring 182 or an electrical terminal 184. Alternatively, in other embodiments, the spacer ring 182 of the swaged pipe fitting 44K may not include an extension 186. Furthermore, in other embodiments, the swaged pipe fitting 44K may not include a carcass isolating ring 100K. In any case, in this manner, a swaged pipe fitting 44 may be implemented and/or deployed (e.g., installed) at pipe segment tubing 22.

Figure 19:
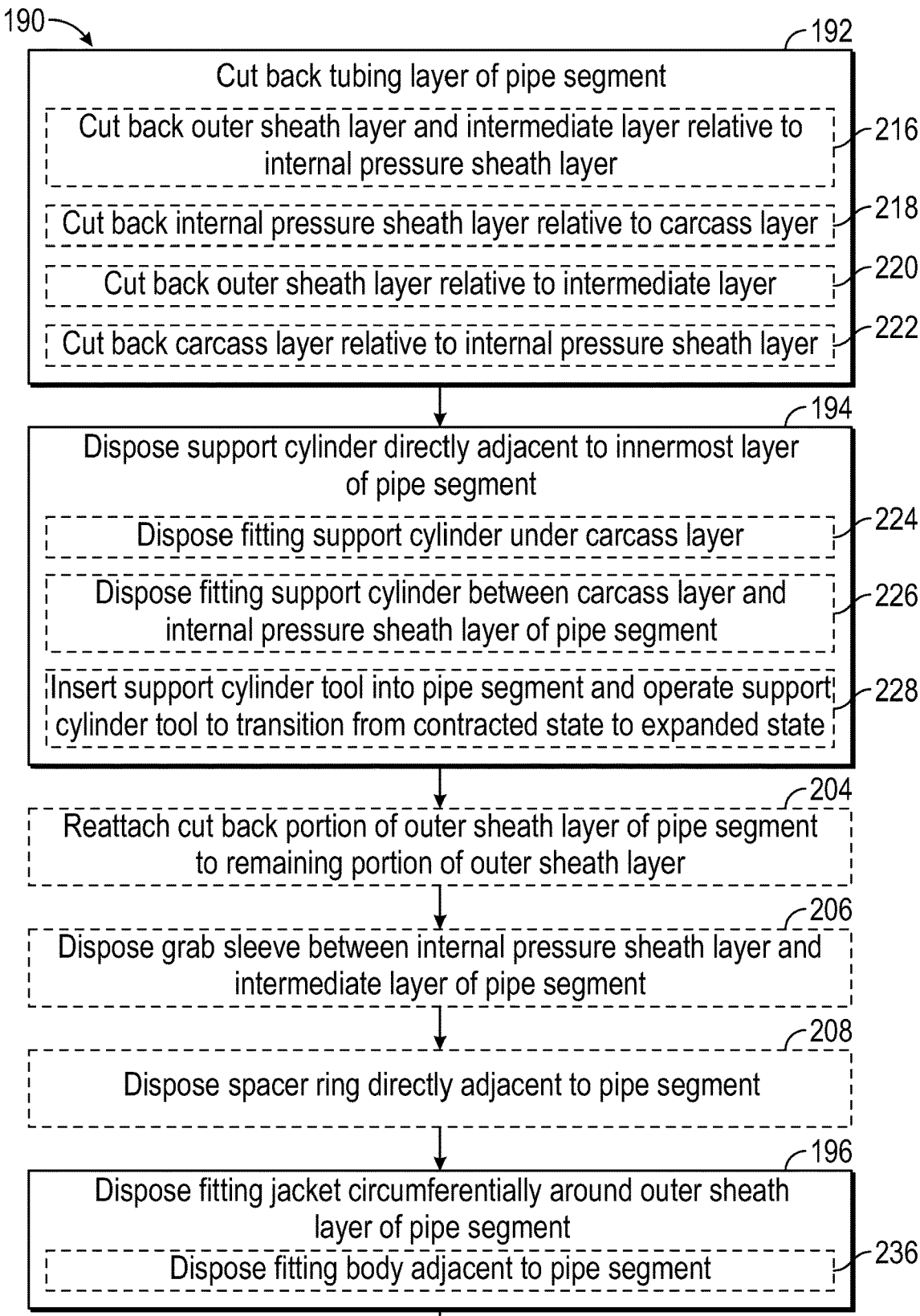
FIG. 19 is a flow diagram of an example of a process for deploying a swaged pipe fitting at a pipe segment, in accordance with an embodiment of the present disclosure.
Figure 19:
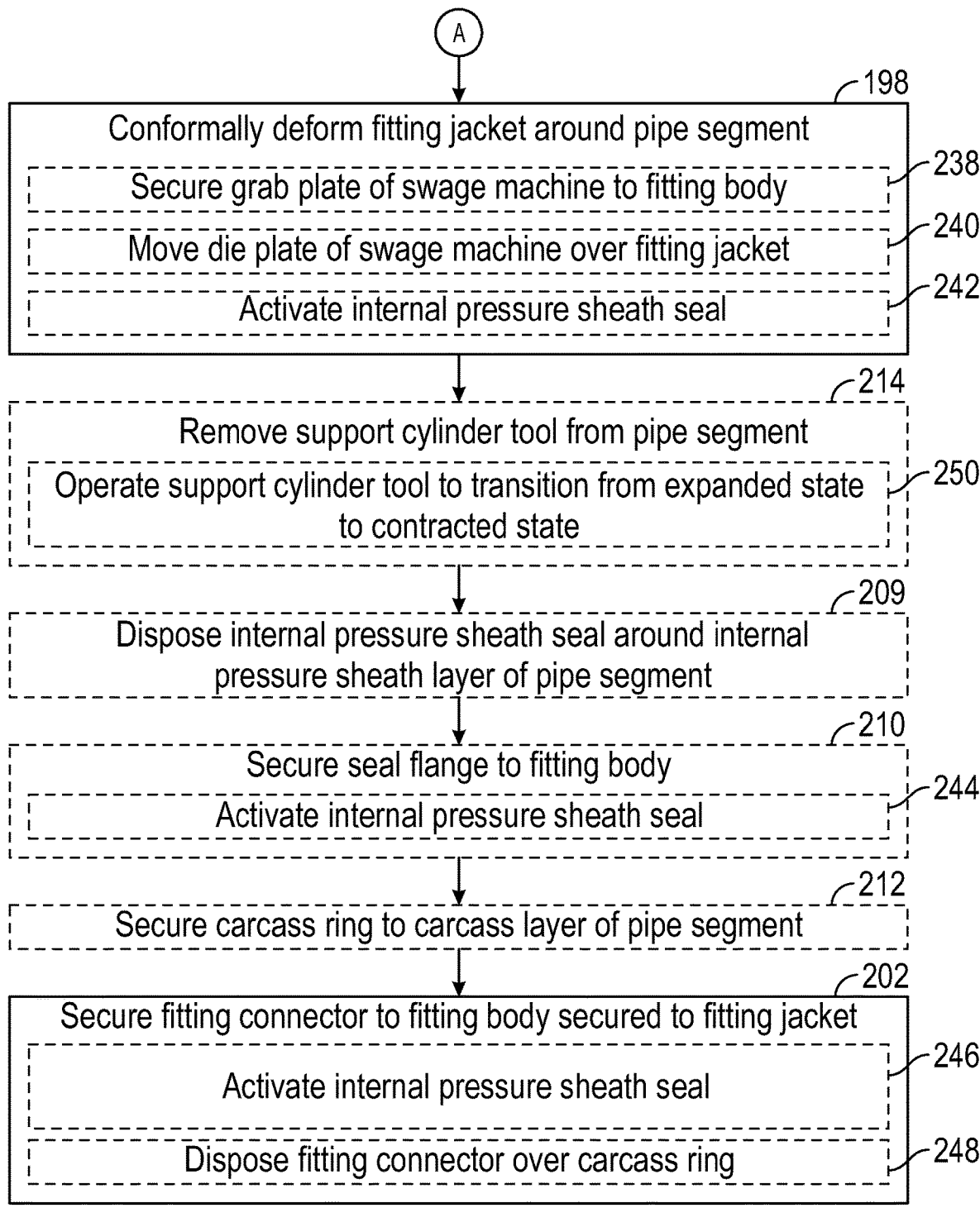

To help further illustrate, an example of a process 190 for installing a swaged pipe fitting 44 at a pipe segment 20 is described in FIG. 19. Generally, the process 190 includes cutting back a tubing layer of a pipe segment (process block 192), disposing a support cylinder directly adjacent to an innermost layer of the pipe segment (process block 194), and disposing a fitting jacket circumferentially around an outer sheath layer of the pipe segment (process block 196). Additionally, the process 190 generally includes conformally deforming the fitting jacket around the pipe segment (process block 198) and securing a fitting connector to a fitting body that is secured to the fitting jacket (process block 202).

In other embodiments, a process 190 for installing a swaged pipe fitting 44 at a pipe segment 20 may include one or more additional blocks and/or omit one or more of the depicted blocks. For example, some embodiments of the process 190 may include reattaching a cut back portion of an outer sheath layer of the pipe segment to a remaining portion of the outer sheath layer (process block 204) while other embodiments of the process 190 do not. As another example, some embodiments of the process 190 may include disposing a grab sleeve between an internal pressure sheath layer and an intermediate layer of the pipe segment (process block 206) while other embodiments of the process 190 do not. As a further example, some embodiments of the process 190 may include disposing a spacer ring directly adjacent to the intermediate layer of the pipe segment (process block 208) while other embodiments of the process do not.

As another example, some embodiments of the process 190 may include disposing an internal pressure sheath seal around the internal pressure sheath layer of the pipe segment (process block 209) while other embodiments of the process 190 do not. As a further example, some embodiments of the process 190 may include securing a seal flange to the fitting body (process block 210) while other embodiments of the process 190 do not. As another example, some embodiments of the process 190 may include securing a carcass ring to a carcass layer of the pipe segment (process block 212) while other embodiments of the process 190 do not. As a further example, some embodiments of the process 190 may include removing a support cylinder tool from the pipe segment (process block 214) while other embodiments of the process 190 do not. Moreover, in other embodiments, one or more of the depicted blocks may be performed in a different order, for example, such that the fitting jacket is disposed around the outer sheath layer of the pipe segment before the support cylinder is disposed directly adjacent to the innermost layer of the pipe segment.

In any case, as described above, one or more tubing layers of a pipe segment 20 at which a swaged pipe fitting 44 is to be deployed may be cut back. As such, deploying a swaged pipe fitting 44 at a pipe segment 20 may generally include cutting back one or more tubing layers of the pipe segment 20 (process block 192). As described with regard to FIGS. 5 and 8-12, in some embodiments, the outer sheath layer 28 and each intermediate layer 38 of the pipe segment 20 may be cut back relative to the internal pressure sheath layer 26 of the pipe segment 20, for example, to enable an internal pressure sheath seal 95 of the swaged pipe fitting 44 to be compressed against the outer surface 97 of the internal pressure sheath layer 26 (process block 216).

Additionally, as described above, in some embodiments, a swaged pipe fitting 44 may include a carcass ring 100, which is secured to the carcass layer 37 of a pipe segment 20 to anchor the carcass layer 37 in the swaged pipe fitting 44. In particular, as described above with regard to FIGS. 8-10, the carcass ring 100 may be secured (e.g., welded and/or threaded) to the outer surface 101 of the carcass layer 37. As described above, to enable the carcass ring 100 to be secured to the outer surface 101 of the carcass layer 37, in such embodiments, the internal pressure sheath layer 26 of the pipe segment 20 may be cut back relative to the carcass layer 37 (process block 218).

Furthermore, as described with regard to FIGS. 10 and 15, in some embodiments, the outer sheath layer 28 of the pipe segment 20 may be cut back relative to an intermediate layer 38 of the pipe segment 20 (process block 220). In particular, as described with regard to FIG. 10, in some such embodiments, the outer sheath layer 28 may be cut back relative to the intermediate layer 38 to enable the leg portion 106 of an internal pressure sheath seal 95, which has a J-shaped axial cross-section profile, to slant against the tubing 22 of the pipe segment 20. Alternatively, as described with regard to FIG. 15, in some such embodiments, the cutoff portion of the outer sheath layer 28 may be a flared section 121, for example, which may be produced by inserting a temporary installation sleeve under the outer sheath layer 28. Moreover, as described with regard to FIGS. 13 and 14, in some embodiments, the carcass layer 37 of the pipe segment 20 may be cut back relative to the internal pressure sheath layer 26 of the pipe segment 20, for example, to enable an internal pressure sheath seal 95 of a swaged pipe fitting 44 to be compressed against the inner surface 30 of the internal pressure sheath layer 26 and/or the swaged pipe fitting 44 to support the internal pressure sheath layer 26 during a swaging operation (process block 222).

In any case, as described above, to support tubing 22 of a pipe segment 20 while a swaged pipe fitting 44 is being swaged thereto, a support cylinder 74 may be disposed directly adjacent to the innermost (e.g., carcass or internal pressure sheath) layer of the pipe segment 20. As such, deploying a swaged pipe fitting 44 at a pipe segment 20 may generally include disposing a support cylinder 74 directly adjacent to (e.g., under or over) the innermost layer of the pipe segment 20 (process block 194). As described above, in some embodiments, the support cylinder 74 may be a component (e.g., feature) of the swaged pipe fitting 44.

More specifically, as described above with regard to FIGS. 5 and 8-14, the support cylinder 74 of a swaged pipe fitting 44 may be disposed under (e.g., within) the carcass layer 37 of a corresponding pipe segment 20 (process block 224). As described with regard to FIG. 12, in some such embodiments, a support cylinder feature of a swaged pipe fitting 44 may be integrated with its fitting connector 46 and, thus, disposing the support cylinder 74 under the carcass layer 37 may include inserting the fitting connector 46 under the carcass layer 37 of the pipe segment 20. Alternatively, as described above with regard to FIGS. 13 and 14, a support cylinder feature of a swaged pipe fitting 44 may be integrated with its fitting body 48 and, thus, disposing the support cylinder 74 under the carcass layer 37 may include inserting the fitting body 48 under the carcass layer 37 of the pipe segment 20.

However, as described above with regard to FIG. 15, the support cylinder 74 of a swaged pipe fitting 44 may be inserted between the carcass layer 37 and the internal pressure sheath layer 26 of a corresponding pipe segment 20 (process block 226). In other words, in such embodiments, the support cylinder 74 of the swaged pipe fitting 44 may be disposed under (e.g., within) the internal pressure sheath layer 26 and each intermediate layer 38 of the pipe segment 20 to produce a flared section 119 along the internal pressure sheath layer 26 and flared sections 120 along each intermediate layer 38. In such embodiments, the cut back portion (e.g., flared section 121) of the outer sheath layer 28 may then be reattached (e.g., poly welded) back to the remaining portion of the outer sheath layer 28 to cover the flared section 120 in each intermediate layer 38 and the flared section 119 in the internal pressure sheath layer 26 (process block 204).

However, as described above, in other embodiments, a swaged pipe fitting 44 may not include a support cylinder 74. Instead, in such embodiments, a support cylinder tool 122 may be used to temporarily support the tubing 22 of a pipe segment 20 while the swaged pipe fitting 44 is being swaged thereto. In particular, the support cylinder tool 122 may be inserted into the pipe bore 32 of the pipe segment 20 while in its contracted state and, subsequently, transitioned from its contracted state to its expanded state such that the outer surface 140 of its support cylinder sections 126 of the support cylinder tool 122 expands against the inner surface of an innermost layer of the pipe segment 20 (process block 228). For example, the support cylinder tool 122 may be operated to transition from its contracted state to its expanded state at least in part by rotating an activation nut 132 to push more of a corresponding activation collar 134 under the support cylinder sections 126 of the support cylinder tool 122.

To facilitate securing a swaged pipe fitting 44 to a pipe segment 20, a fitting jacket 50 of the swaged pipe fitting 44 may be disposed circumferentially around the outer sheath layer 28 of the pipe segment 20 (process block 196). As described above, a fitting jacket 50 of a swaged pipe fitting 44 may be secured (e.g., welded) to the fitting body 48 of the swaged pipe fitting 44. As such, disposing the fitting jacket 50 of a swaged pipe fitting 44 circumferentially around the outer sheath layer 28 of a pipe segment 20 may include disposing the fitting body 48 of the swaged pipe fitting 44 adjacent to the pipe segment 20 (process block 236).

However, in some embodiments, the fitting body 48 of a swaged pipe fitting 44 may be made from a different type of metal as compared to an intermediate layer 38 of a corresponding pipe segment 20. For example, the fitting body 48 may be made of stainless steel while solid material in the intermediate layer 38 is made of carbon steel. To facilitate providing electrical continuity (e.g., to provide cathodic protection) to the intermediate layer 38, in some such embodiments, a swaged pipe fitting 44 may include a spacer ring 182, which is made from the same type of metal as the intermediate layer 38 of the pipe segment 20 and can be disposed directly adjacent to the intermediate layer 38 of the pipe segment 20. Thus, in such embodiments, deploying the swaged pipe fitting 44 at a pipe segment 20 may include disposing a spacer ring 182 directly adjacent to an intermediate layer 38 of the pipe segment 20, for example, at least in part by inserting an extension 186 on the spacer ring 182 under the intermediate layer 38 (process block 208). To bridge the gap between structural support provided to the internal pressure sheath layer 26 of the pipe segment 20 by the fitting body 48 of the swaged pipe fitting 44 and the structural support provided by one or more reinforcement layers 34 of the pipe segment 20, the spacer ring 182 may be disposed directly adjacent to the internal pressure sheath layer 26, for example, at least in part by inserting an extension 186 on the spacer ring 182 between the internal pressure sheath layer 26 and the one or more reinforcement layers 34 (process block 208).

The fitting jacket 50 of the swaged pipe fitting 44 may then be conformally deformed (e.g., swaged) around the tubing 22 of the pipe segment 20 such that the inner surface 52 of the fitting jacket 50 engages the outer surface 54 of the pipe segment tubing 22 and, thus, facilitates securing the swaged pipe fitting 44 to the pipe segment 20 as well as sealing the pipe segment tubing 22 within the swaged pipe fitting 44 (process block 198). In some embodiments, a fitting jacket 50 of a swaged pipe fitting 44 may be swaged using a swage machine 56. As described above, a swage machine 56 may generally include a grab plate 62, which may facilitate securing the swage machine 56 to the fitting body 48 of a swaged pipe fitting 44, for example, via a grab attachment 66 that has an L-shaped axial cross-section profile. Furthermore, as described above, a swage machine 56 may generally include a die plate 64, which may enable a set of die segments 68 to be loaded in the swage machine 56 such that the set of die segments 68 compress a fitting jacket 50 of a swaged pipe fitting 44 inwardly in a radial direction 72 when moved over the fitting jacket 50 in an axial direction 70. Thus, in such embodiments, conformally deforming the fitting jacket 50 of a swaged pipe fitting 44 around a pipe segment 20 may include securing a grab plate 62 of a swage machine 56 to the fitting body 48 of the swaged pipe fitting 44 (process block 238) and moving a die plate 64 of the swage machine 56 over the fitting jacket 50 (process block 240).

To improve securement (e.g., anchoring) of an intermediate layer 38 of a pipe segment 20 therein, as described above, in some embodiments, a swaged pipe fitting 44 may include a grab sleeve 82, which may be disposed between the internal pressure sheath layer 26 and the intermediate layer 38 of the pipe segment 20. In such embodiments, deploying the swaged pipe fitting 44 at a pipe segment 20 may include disposing a grab sleeve 82 between the internal pressure sheath layer 26 and an intermediate layer 38 of the pipe segment 20 before a fitting jacket 50 of the swaged pipe fitting 44 is disposed around the outer sheath layer 28 of the pipe segment 20 (process block 206). The grab sleeve 82 may include a slit 84 that enables the grab sleeve 82 to grab onto the internal pressure sheath layer 26 when the fitting jacket 50 is swaged such that the intermediate layer 38 of the pipe segment 20 is compressed between the grab sleeve 82 and the fitting jacket 50 and, thus, anchored in the swaged pipe fitting 44. Additionally or alternatively, swaging a fitting jacket 50 of a swaged pipe fitting 44 may compress one or more intermediate (e.g., reinforcement) layers 38 of a corresponding pipe segment 20 between the fitting jacket 50 and a support cylinder 74 of the swaged pipe fitting 44, thereby anchoring the one or more intermediate layers 38 in the swaged pipe fitting 44.

In any case, as described above, in some embodiments, a support cylinder tool 122 may be temporarily used to support the tubing 22 of a pipe segment 20 during a swaging operation. Thus, in such embodiments, after conformally deforming the fitting jacket 50 of the swaged pipe fitting 44, the support cylinder tool 122 may be removed from within the pipe segment 20 (process block 214). As described above, in such embodiments, the support cylinder tool 122 may be operated to transition from its expanded state to its contracted state and withdrawn from within the pipe segment 20 while in its contracted state (process block 250). The support cylinder tool 122 may be operated to transition from its expanded state to its contracted state at least in part by rotating an activation nut 132 to enable the pipe segment 20 to push more of a corresponding activation collar 134 out from under the support cylinder sections 126 while contracting radially inward against the support cylinder sections 126.

Furthermore, as described, in some embodiments, an internal pressure sheath seal 95 of a swaged pipe fitting 44 may be disposed under a fitting jacket 50 of the swaged pipe fitting 44. In such embodiments, the internal pressure sheath seal 95 may have a J-shaped axial cross-section profile that includes a hook portion 104, which interlocks with a carcass ring 100 of the swaged pipe fitting 44, and a leg portion 106, which may slant against the tubing 22 of a pipe segment 20. Thus, when the fitting jacket 50 is conformally deformed around the pipe segment tubing 22, in such embodiments, the internal pressure sheath seal 95 may be compressed against the pipe segment tubing 22, thereby activating the internal pressure sheath seal 95 (process block 242).

However, as described above, in other embodiments, an internal pressure sheath seal 95 of a swaged pipe fitting 44 may be compressed against the fitting body 48 of the swaged pipe fitting 44. Thus, in such embodiments, installing the swaged pipe fitting 44 to a pipe segment 20 may include disposing an internal pressure sheath seal 95 around the internal pressure sheath layer 26 of the pipe segment 20 after (e.g., behind) the fitting body 48 of the swaged pipe fitting 44 (process block 209). In some such embodiments, the internal pressure sheath seal 95 may be compressed between the fitting body 48 and a seal flange 102 of the swaged pipe fitting 44.

In other words, in such embodiments, installing the swaged pipe fitting 44 to a pipe segment 20 may include securing a seal flange 102 to the fitting body 48 of the swaged pipe fitting 44 (process block 210), for example, such that a corresponding internal pressure sheath seal 95 is compressed against the internal pressure sheath layer 26 of the pipe segment 20 due to compression between the fitting body 48 and the seal flange 102 and, thus, activated (process block 244). In some such embodiments, a seal flange 102 may be secured to a corresponding fitting body 48 via one or more threaded fasteners 92, such as a bolt or a screw. However, in other embodiments, a seal flange 102 may be secured to a corresponding fitting body 48 via hot tooling, such as welding and/or brazing.

In any case, as described above, the fitting connector 46 of the swaged pipe fitting 44 may then be secured to its fitting body 48 (process block 202). In some embodiments, the fitting connector 46 may be secured to a seal flange 102 of the swaged pipe fitting 44, which is secured to the fitting body 48. More specifically, in some such embodiments, a fitting connector 46 may be secured to a corresponding seal flange 102 and a corresponding fitting body 48 via one or more threaded fasteners 92, such as a bolt or a screw. However, in other embodiments, a fitting connector 46 may be secured to a corresponding seal flange 102 via hot tooling, such as welding and/or brazing.

In other embodiments, the fitting connector 46 of a swaged pipe fitting 44 may be secured directly to a corresponding fitting body 48, for example, via one or more threaded fasteners 92, such as a bolt or a screw, and/or hot tooling, such as welding and/or brazing. In fact, in some such embodiments, an internal pressure sheath seal 95 of a swaged pipe fitting 44 may be compressed between its fitting body 48 and its fitting connector 46. Accordingly, in such embodiments, securing the fitting connector 46 to the fitting body 48 may compress the internal pressure sheath seal 95 therebetween such that the internal pressure sheath seal 95 is compressed against the internal pressure sheath layer 26 of a pipe segment 20 and, thus, activated (process block 246).

To facilitate anchoring the carcass layer 37 of a pipe segment 20 therein, in some embodiments, a swaged pipe fitting 44 may include a carcass anchoring ring 100, which may be secured to the carcass layer 37, and the fitting connector 46 of the swaged pipe fitting 44 may accommodate the carcass ring 100. In such embodiments, installing the swaged pipe fitting 44 to a pipe segment 20 may include securing a carcass ring 100 to the carcass layer 37 of the pipe segment 20, for example, at least in part by welding and/or threading the carcass ring 100 onto the outer surface 101 of the carcass layer 37 (process block 212). Additionally, in such embodiments, securing the fitting connector 46 to the fitting body 48 may include disposing the fitting connector 46 over a carcass ring 100, which is secured to the carcass layer 37 of a pipe segment 20, for example, such that the carcass ring 100 is trapped between the fitting connector 46 and the internal pressure sheath layer 26 of the pipe segment 20 or between the fitting connector 46 and a seal flange 102 of the swaged pipe fitting 44 (process block 248). In this manner, the present disclosure provides techniques for implementing and/or deploying a swaged pipe fitting.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed is:

1. A system comprising:
   pipe segment tubing, wherein the pipe segment tubing comprises:
      a carcass layer;
      an internal pressure sheath layer disposed around the carcass layer;
      a reinforcement layer disposed around the internal pressure sheath layer; and
      an outer sheath layer disposed around the reinforcement layer; and
   a swaged pipe fitting secured to the pipe segment tubing, wherein the swaged pipe fitting comprises:

a fitting body that defines a bore;

an internal pressure sheath seal configured to seal the internal pressure sheath layer of the pipe segment tubing within the swaged pipe fitting;

a carcass isolating ring configured to electrically isolate the carcass layer of the pipe segment tubing in the swaged pipe fitting; and a fitting jacket secured to the fitting body, wherein the fitting jacket is conformally deformed around the pipe segment tubing to anchor the reinforcement layer of the pipe segment tubing in the swaged pipe fitting.

2. The system of claim 1, wherein the carcass layer of the pipe segment tubing comprises an interlocked metal layer.

3. The system of claim 1, wherein the fitting jacket of the swaged pipe fitting is conformally deformed around the pipe segment tubing to form a seal between the outer sheath layer of the pipe segment tubing and the fitting jacket of the swaged pipe fitting to facilitate blocking ingress of external environmental fluid into the swaged pipe fitting.

4. The system of claim 1, comprising a swage machine, wherein the swage machine comprises:

a grab plate configured to secure the swage machine to the fitting body of the swaged pipe fitting; and a die plate comprising a set of die segments, wherein the swage machine is configured to move the grab plate and the die plate toward one another such that the set of die segments compresses the fitting jacket of the swaged pipe fitting radially inward.

5. The system of claim 1, wherein:

the reinforcement layer defines a fluid conduit within a tubing annulus of the pipe segment; and the swaged pipe fitting comprises:

a fluid path defined in the fitting body of the swaged pipe fitting such that the fluid path is fluidly connected to the fluid conduit in the tubing annulus of the pipe segment; and a vent valve fluidly connected to the fluid path defined in the fitting body.

6. The system of claim 1, wherein:

the swaged pipe fitting comprises a fitting connector secured to the fitting body to enable the swaged pipe fitting to be connected to another pipeline component; and the internal pressure sheath seal is compressed against the internal pressure sheath layer of the pipe segment tubing due to compression between the fitting connector and the fitting body of the swaged pipe fitting.

7. The system of claim 1, wherein the swaged pipe fitting comprises a grab sleeve inserted between the internal pressure sheath layer and the reinforcement layer of the pipe segment tubing before the fitting jacket is conformally deformed around the pipe segment tubing.

8. The system of claim 1, wherein the fitting jacket of the swaged pipe fitting is conformally deformed around the pipe segment tubing to facilitate blocking ingress of external environmental fluid into the swaged pipe fitting and, thus, an annulus of the pipe segment tubing.

9. The system of claim 1, wherein the outer sheath layer is an outermost layer of the pipe segment tubing.

10. A system comprising a swaged pipe fitting, wherein the swaged pipe fitting comprises:

a fitting body that defines a body bore;

a fitting connector configured to be secured to the fitting body to enable the swaged pipe fitting to be connected to another pipeline component;

a face seal configured to be compressed between the fitting body and the fitting connector;

an internal pressure sheath seal configured to be compressed against an internal pressure sheath layer of a pipe segment to seal the internal pressure sheath layer within the swaged pipe fitting;

a carcass isolating ring configured to electrically isolate a carcass layer of the pipe segment in the swaged pipe fitting; and a fitting jacket secured to the fitting body, wherein the fitting jacket is configured to be conformally deformed around an outer sheath layer of the pipe segment to secure the swaged pipe fitting to the pipe segment and to seal the outer sheath layer of the pipe segment within the swaged pipe fitting.

11. The system of claim 10, wherein the swaged pipe fitting comprises:

a spacer ring configured to directly abut an intermediate layer of the pipe segment to provide electrical continuity between the intermediate layer and the swaged pipe fitting; and a vent valve configured to be fluidly connected to an annular gap defined in the pipe segment via a first fluid path formed through the fitting body and a second fluid path formed through the spacer ring.

12. The system of claim 10, wherein the fitting jacket of the swaged pipe fitting is configured to be conformally deformed around the outer sheath layer of the pipe segment to facilitate blocking ingress of external environmental fluid into the swaged pipe fitting and, thus, a tubing annulus of the pipe segment.

13. The system of claim 10, wherein the outer sheath layer is an outermost layer of the pipe segment.

* * * * *